US011599675B2

(12) United States Patent
Juniper et al.

(10) Patent No.: US 11,599,675 B2
(45) Date of Patent: Mar. 7, 2023

(54) DETECTING DATA LEAKAGE TO WEBSITES ACCESSED USING A REMOTE BROWSING INFRASTRUCTURE

(71) Applicant: McAfee, LLC, San Jose, CA (US)

(72) Inventors: Andrew Naidley Juniper, Aylesbury (GB); Maayan Tal, Nir Tzvi (IL); Justin Timothy Cragin, Aurora, CO (US); Brandon Beau Adkins, Elkridge, MD (US); Matan Gillon, Kiryat Ono (IL)

(73) Assignee: McAfee, LLC, San Jose, CA (US)

( * ) Notice: Subject to any disclaimer, the term of this patent is extended or adjusted under 35 U.S.C. 154(b) by 290 days.

(21) Appl. No.: 17/038,434

(22) Filed: Sep. 30, 2020

(65) Prior Publication Data

US 2022/0100902 A1 Mar. 31, 2022

(51) Int. Cl.
*G06F 21/62* (2013.01)
*H04L 9/40* (2022.01)
*G06F 16/955* (2019.01)

(52) U.S. Cl.
CPC ...... *G06F 21/6263* (2013.01); *G06F 16/9566* (2019.01); *H04L 63/0281* (2013.01)

(58) Field of Classification Search
CPC ............. G06F 21/6263; G06F 16/9566; H04L 63/0281
USPC .......................................................... 726/12
See application file for complete search history.

(56) References Cited

U.S. PATENT DOCUMENTS

| 9,152,821 | B2 | 10/2015 | Paul et al. |
| 9,811,674 | B2 * | 11/2017 | Paul .................. G06F 21/60 |
| 11,120,406 | B2 * | 9/2021 | Mody ............... G06Q 10/107 |
| 11,245,731 | B1 * | 2/2022 | Guruswamy ........ H04L 63/20 |
| 2002/0032787 | A1 * | 3/2002 | Overton ............. H04L 67/535 707/E17.115 |
| 2015/0363600 | A1 * | 12/2015 | Jin ................. G06F 21/6245 726/26 |
| 2016/0080492 | A1 * | 3/2016 | Cheung ............... H04L 63/08 709/204 |
| 2021/0044585 | A1 * | 2/2021 | Kahol ............. H04L 63/0876 |

* cited by examiner

*Primary Examiner* — Thanh T Le
(74) *Attorney, Agent, or Firm* — Patent Capital Group

(57) ABSTRACT

An apparatus, related devices and methods, having memory to store instructions; and a processor to execute the instructions, and the apparatus is configured to receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy; receive a plurality of inputs to the client device associated with the transfer request; create a submission request that includes the plurality of inputs and metadata; send the submission request to the DLPe module; receive a response from the DLPe module, wherein the response includes an instruction to allow, to disallow, or to amend and allow the submission request; and process the submission request according to the instruction.

20 Claims, 17 Drawing Sheets

DETECTING DATA LEAKAGE TO WEBSITES ACCESSED USING A REMOTE BROWSING INFRASTRUCTURE

TECHNICAL FIELD

This disclosure relates in general to computer security and, more particularly though not exclusively, to a system and method for detecting data leakage to websites accessed using a remote browsing infrastructure.

BACKGROUND

The field of computer security has become increasingly important in today's society. In particular, web-based communications can provide a medium for exchanging data between different devices connected via computer networks. While the use of a network has transformed business and personal communications, it has also been used as a vehicle for unauthorized access to sensitive information. As attack vectors from web traffic are getting more and more sophisticated, many organizations are implementing remote browsing infrastructure to prevent network intrusions that may expose confidential and/or proprietary data to unauthorized individuals.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
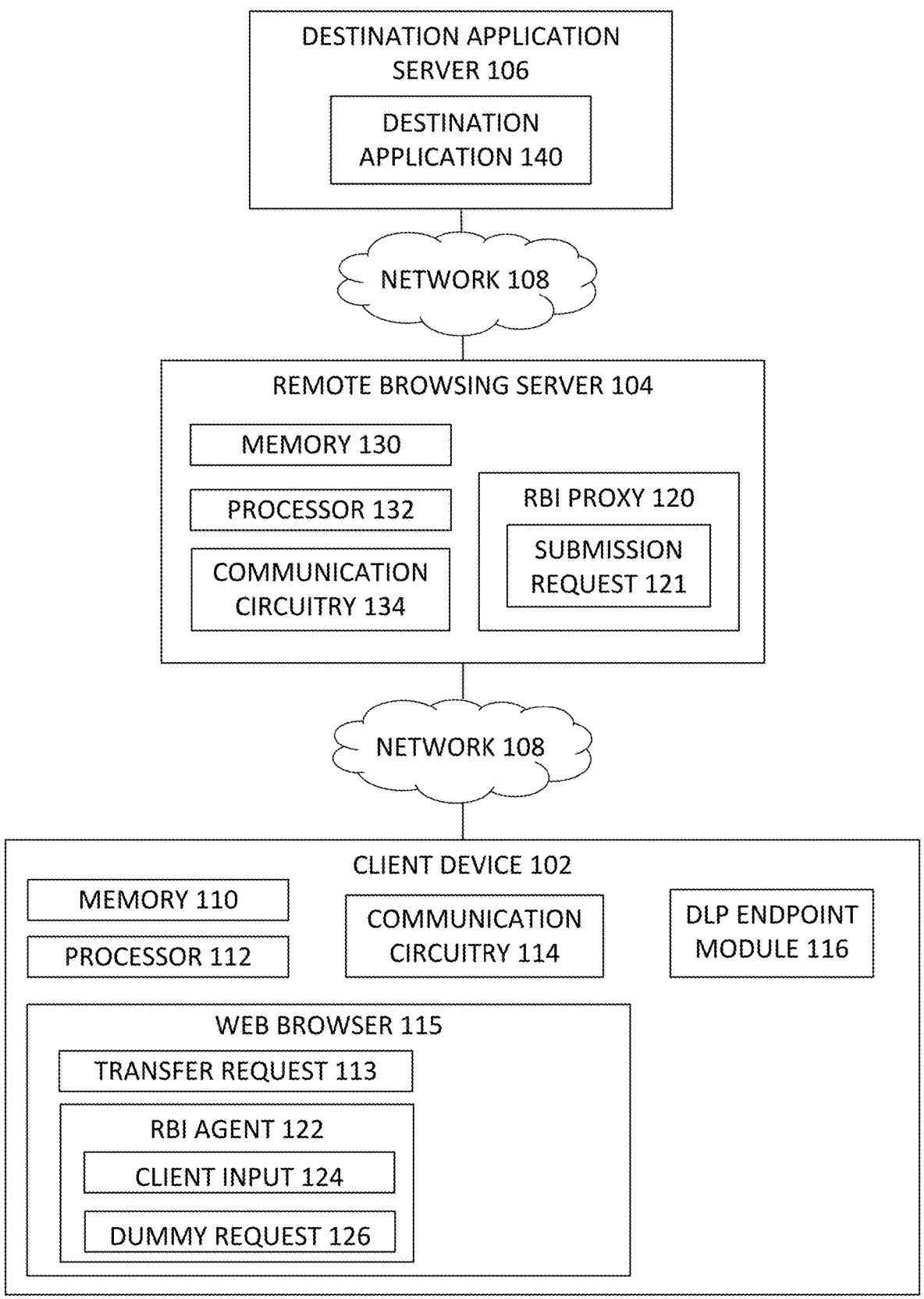
FIG. 1 is block diagram of an example system for detecting data leakage to websites accessed with remote browsing infrastructure, in accordance with various embodiments of the present disclosure.

An apparatus, including systems and methods, for detecting data leakage from a client device having a remote browser isolation (RBI) configuration and a DLPe module is disclosed herein. For example, in some embodiments, an apparatus having one or more memory elements operable to store instructions; and one or more processors operable to execute the instructions, is configured to receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy; receive, from the RBI agent, a plurality of inputs to the client device associated with the transfer request; create, by the RBI proxy, a submission request, wherein the submission request includes the plurality of inputs and associated metadata; send, from the RBI proxy, the submission request to the DLPe module; receive, by the RBI proxy, a response to the submission request, wherein the response includes an instruction to allow the submission request, to disallow the submission request, or to amend the submission request and allow the amended submission request; and process, by the RBI proxy, the submission request according to the instruction in the response.

As computer usage moves increasingly to online services, web applications have become an essential part of personal computing. Many day-to-day user activities involve communications to and from websites, including low-reputation websites. Personal and proprietary data may be leaked, intentionally or unintentionally, via web browsers and web applications. A conventional solution involves a remote browser isolation (RBI) configuration, which includes a client-side component, referred to as an RBI Agent, and a server-side component, referred to as an RBI Proxy. In the RBI configuration, a web browser is redirected to an alternate application gateway, where the RBI Proxy acts as an intermediary for requests between the web browser and the destination web application. The RBI Agent resides on the client device as part of a web browser and renders the destination web application (e.g., provides a visual representation the contents). The RBI Agent is responsible for collecting data inputs to the client device and sending the inputs to the RBI Proxy. The RBI Proxy analyzes the inputs received from the RBI Agent and sends the inputs to the destination web application. Any updates to the destination web application display caused by the inputs or caused by the destination web application presentation layer are sent back to RBI Agent to update the rendered destination web application. The RBI configuration ensures that any attack that will exploit any vulnerability of the web browser or operating system will not be able to gain access to the local client device, to the organization, or to locally stored data.

Data leakage protection (DLP) is a technology that enables an organization to control the outbound flow of data and documents to external and internal parties. For example, the organization may monitor and block the transmission of documents marked with a "confidential" header from leaving the organization boundary. In another example, the organization may block any textual record (e.g., a document, an email, a message, or a post) that contains a credit card number from leaving the organization boundary. The DLP system may include a DLP server that performs the monitoring and scanning of outbound data or may perform the monitoring and scanning of outbound data on an endpoint (e.g., on a client device) One of the strongest locations for DLP enforcement is on the endpoint where data may be monitored via a variety of leakage channels (e.g., Internet/ Websites, printers, removable storage, or email). The DLP endpoint (DLPe) may monitor each transaction and may process the textual content and operational context of the transaction to determine whether the transaction is allowed or needs to be monitored according to a defined organization policy. When the DLPe monitors a web browser accessing a destination web application using the RBI configuration, the DLPe does not recognize the destination web application as a remote and untrusted website. When the DLPe is interfacing with the RBI proxy and not the actual destination web application, some transactions may be hidden from the DLPe. As a result, the DLPe may not fully analyze all aspects of the transaction or transactions when determining whether or not to allow or block the transaction. In another example, the DLPe may monitor multiple transactions individually but may not recognize that the transactions are related, such that the full content of the transactions (i.e., the combined content of the transactions) is not analyzed. For example, when a client that types a social security number into a web form and submits, without the RBI configuration, the DLPe would see the web form submission event, inspect the contents, and discover the social security number, but with the RBI configuration, the individual keystrokes of the social security number would be sent to the RBI proxy and, when submitted, the form submission would be on the RBI Proxy side and completely invisible to the DLPe. In another example, when the client device transfers data files to the RBI Proxy via a web socket using a proprietary protocol or via a controlled communication channel, the DLPe is prevented from scanning the data files being sent to the destination web application. A system that fully integrates an RBI configuration with a DLP configuration to prevent data leakage to remote websites may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. For convenience, the phrase "FIG. 2" may be used to refer to the collection of drawings of FIGS. 2A-2B, etc. Although certain elements may be referred to in the singular herein, such elements may include multiple sub-elements.

FIG. 1 is a simplified block diagram of a communication system 100 that enables detecting data leakage to a remote website, in accordance with an embodiment of the present disclosure. As illustrated in FIG. 1, an embodiment of communication system 100 may include a client device 102, a remote browsing server 104, a destination application server 106, and network 108. The client device 102 may include memory 110, a processor 112, communication circuitry 114, a DLPe module 116, and a web browser 115 that may include an RBI agent 122 (i.e., the client device 102 is running the RBI agent 122). The remote browsing server 104 may include memory 130, a processor 132, communication circuitry 134, and an RBI proxy 120. The destination application server 106 may include a destination application 140. The destination application 140 also may be referred to herein as the "remote website." The client device 102, the remote browsing server 104, and the destination application server 106 may be in communication using a network 108. Although network 108 is shown as a single network, network 108 may include any number of networks.

Communications between the client device 102 and the destination application server 106 may be routed through the remote browsing server 104. For example, the RBI proxy 120 may be configured to act as an interface between the web browser 115 on the client device 102 and the destination application 140 on the destination application server 106. The RBI agent 122 may be configured to collect a client input 124 to the client device 102 and send the client input 124 to the RBI proxy. The client input 124 may include, for example, one or more of a keystroke, a file selection prior to upload, a file upload, and a cookie, among others. The client input 124 may include a single client input or may include a plurality of client inputs. The RBI agent 122 may store the client input 124 in memory 110. The RBI proxy 120 may receive a transfer request 113 from the web browser 115 seeking to send data to a remote location, such as the destination application 140. In some embodiments, the transfer request 113 is an actual request to send data. In some embodiments, the client input 124 functions as the transfer request 113 where the RBI proxy 120 identifies the client input 124 as an attempt to send data to the destination application 140. In some embodiments, the RBI proxy 120 may be configured to create a submission request 121 based on a transfer request 113 received from the web browser 115 on the client device 102. The transfer request 113 may include a request to send data, such as a file or one or more keystrokes, to the destination application 140. In some embodiments, the RBI proxy 120 may receive the client input 124, which is indicative of a transfer request 113, and may create a submission request 121 that assembles data associated with the attempt to send outbound data. For example, the submission request 121 may include the transfer request received from the web browser 115, the client input 124 received from the RBI agent 122, and/or associated metadata, such as metadata identifying the client device 102 and the destination application 140. The submission request 121 may further include other client information and other metadata. The RBI proxy 120 creates the submission request 121 by assembling relevant data associated with the data transfer so that the DLPe module 116 may determine whether or not to allow the data transfer based on complete data. For example, the submission request 121 may assemble multiple transfer requests for single keystrokes into a single content request to transfer a credit card number. In another example, the submission request may combine streams of different text such that the streams of text are arranged into a complete original pattern. In yet another example, the submission request may assemble and correlate data into a structured format, for example, a social security number, to provide the data in a complete format. The RBI proxy 120 delays processing the submission request 121 until instructions on how to process the submission request 121 are received from the DLPe module 116.

The RBI proxy 120 sends the submission request 121 to the RBI agent 122. The RBI agent 122 creates a dummy request 126 for the DLPe module 116 to intercept in order for the DLPe module 116 to analyze and provide instructions on how to process the submission request 121. The dummy request 126 is a modified version of the submission request 121, where the dummy request 126 is modified to prevent the submission request 121 from reaching the destination application 140. For example, the RBI agent 122 may modify the submission request by adding a request header that will be blocked by a network monitoring service, by adding an invalid port to a Uniform Resource Locator (URL), by adding an invalid component to a host name in the URL, by removing one or more authentication tokens, or by assigning an invalid protocol (e.g., hddp://), among others.

The RBI agent 122 makes the dummy request 126 available to the DLPe module 116 by submitting the dummy request 126. The DLPe module 116 intercepts the dummy request 126 from within the web browser 115, inspects the dummy request 126, and determines whether to block or to allow the web browser 115 to continue to process the dummy request (i.e., the submission request 121) based on one or more security policies. The DLPe module 116 provides a response that includes instructions on whether to allow the submission request, or disallow the submission request The RBI agent 122 retrieves and analyzes the response from the DLPe module 116 and sends the response to the RBI proxy 120. The RBI proxy 120 receives the response from the RBI agent 122 and processes the submission request 121 according to the instructions in the response. If the response indicates that the submission request is allowed, the RBI proxy 120 transmits the submission request 121 to the destination application 140. If the response indicates that the submission request is disallowed or denied, the RBI proxy 120 does not send the submission request 121 to the destination application 140. In some embodiments, if the submission request 121 is denied, the RBI proxy 120 may take further action, such as by logging the denied submission request (i.e., the attempt to transfer outbound data and/or the denial), or by notifying a network administrator of the denied submission request. In some embodiments, if the submission request 121 is denied, the RBI agent 122 may take further action, such as by notifying a user of the client device that the transfer request is denied, or by prompting a user of the client device for confirmation of the transfer request.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the client device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The communication circuitry 114 may be used to send and receive commands, requests, and other data to and from the client device 102. The client device 102 may include a web browser 115 that may create a transfer request 113. Examples of web browsers 115 include Mozilla Firefox® browser, Apple Safari® application program, Google Chrome™ browser, and Microsoft Internet Explorer® browser. Although FIG. 1 depicts a single web browser 115, the web browser 115 may include one or more web browsers.

Remote browsing server 104 may include memory 130, a processor 132, communication circuitry 134, and an RBI proxy 120 that may create a submission request 121. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the remote browsing server 104. Client device 102 and remote browsing server 104 may be in communication using network 108. Although network 108 is shown as a single network, network 108 may include any number of networks, such as one or more intranets connected to the internet.

The destination application server 106 may include the destination application 140. The destination application 140 may be any web application and may include any client-server computer program that the client computer runs (e.g., via the RBI proxy interface) in the web browser 115. Examples of the destination application 140 include online retail sales, online banking, social media accounts, online gaming, and webmail, such as Mozilla® Thunderbird®, Microsoft® Outlook®, Google® Gmail®, and Apple® iCloud® mail, among others.

The one or more processors 112, 132 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 and the remote browsing server 104 may further include a chipset (not shown) for controlling communications between one or more processors and one or more of the other components of the device. The processors 112, 132 may also include one or more application specific integrated circuits (ASICs) or application specific standard products (ASSPs) for handling specific data processing functions or tasks.

The one or more memory elements 110, 130 store information and data. The one or more memory elements 110, 130 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110, 130 may store program instructions that are loadable and executable on the processor(s) as well as data generated or received during the execution of these programs. The memory 110, 130 may have stored thereon software modules and/or instructions associated with other components of the device. The memory 110, 130 may include one or more operating systems (O/S) application software.

The client device 102 and the remote browsing server 104 may include communication circuitry 114, 134. The communication circuitry 114, 134 may be embodied as any communication circuitry, device, or collection thereof, capable of enabling communications between the client device 102, the remote browsing server 104, and other remote devices (e.g., the destination application server 106). The terms "communication circuitry" and "input/output (I/O) circuitry" may be used interchangeably herein. The communication circuitry 114, 134 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 and the remote browsing server 104 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the communication system 100. Network 108 may provide a communicative interface between the client device 102, the remote browsing server 104, and the destination application server 106, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In communication system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices (e.g., between the client device 102, the remote browsing server 104, and/or the destination application server 106). A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2A:
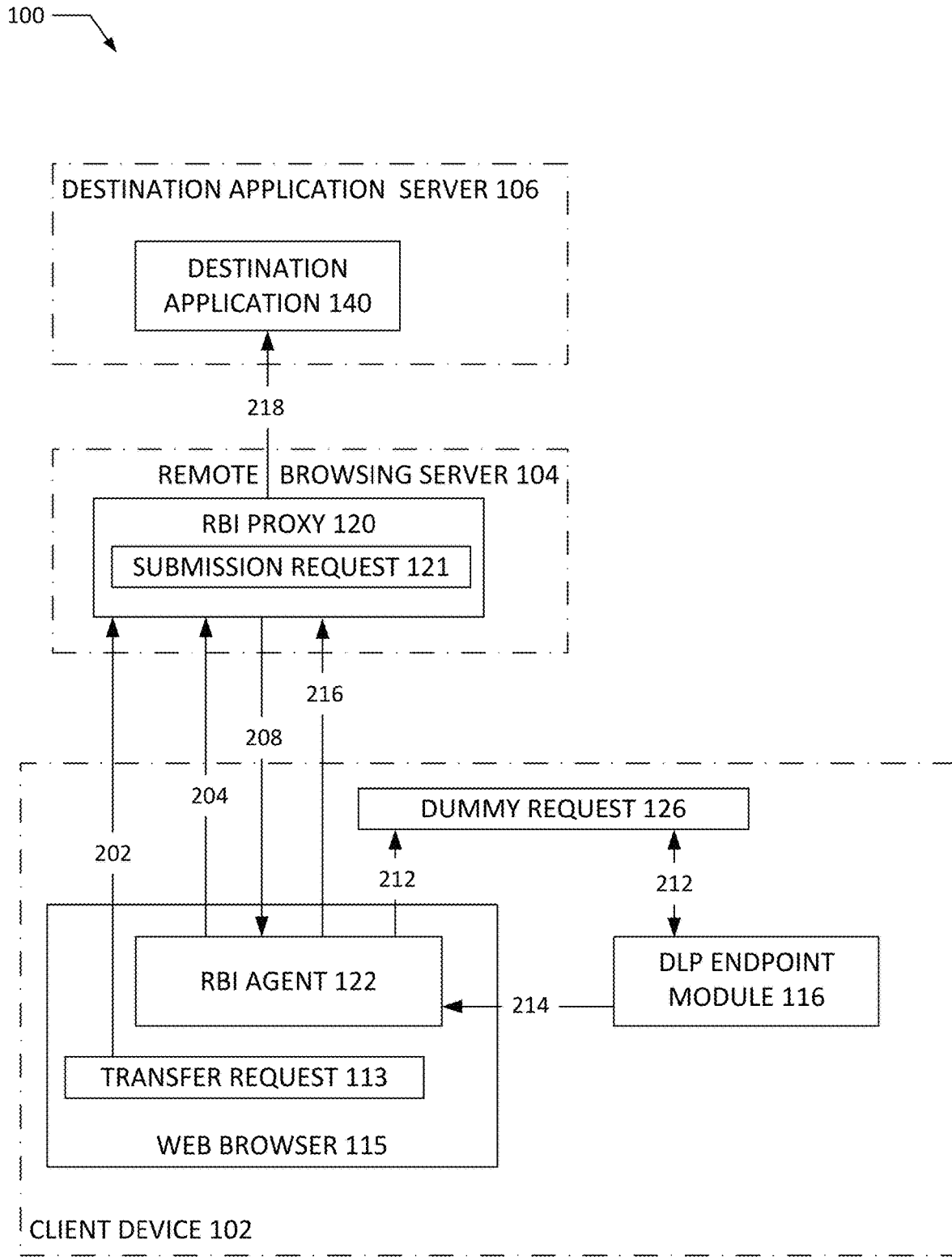
FIG. 2A is a simplified block diagram illustrating potential operations of the example system of FIG. 1, in accordance with various embodiments of the present disclosure.
Figure 2B:
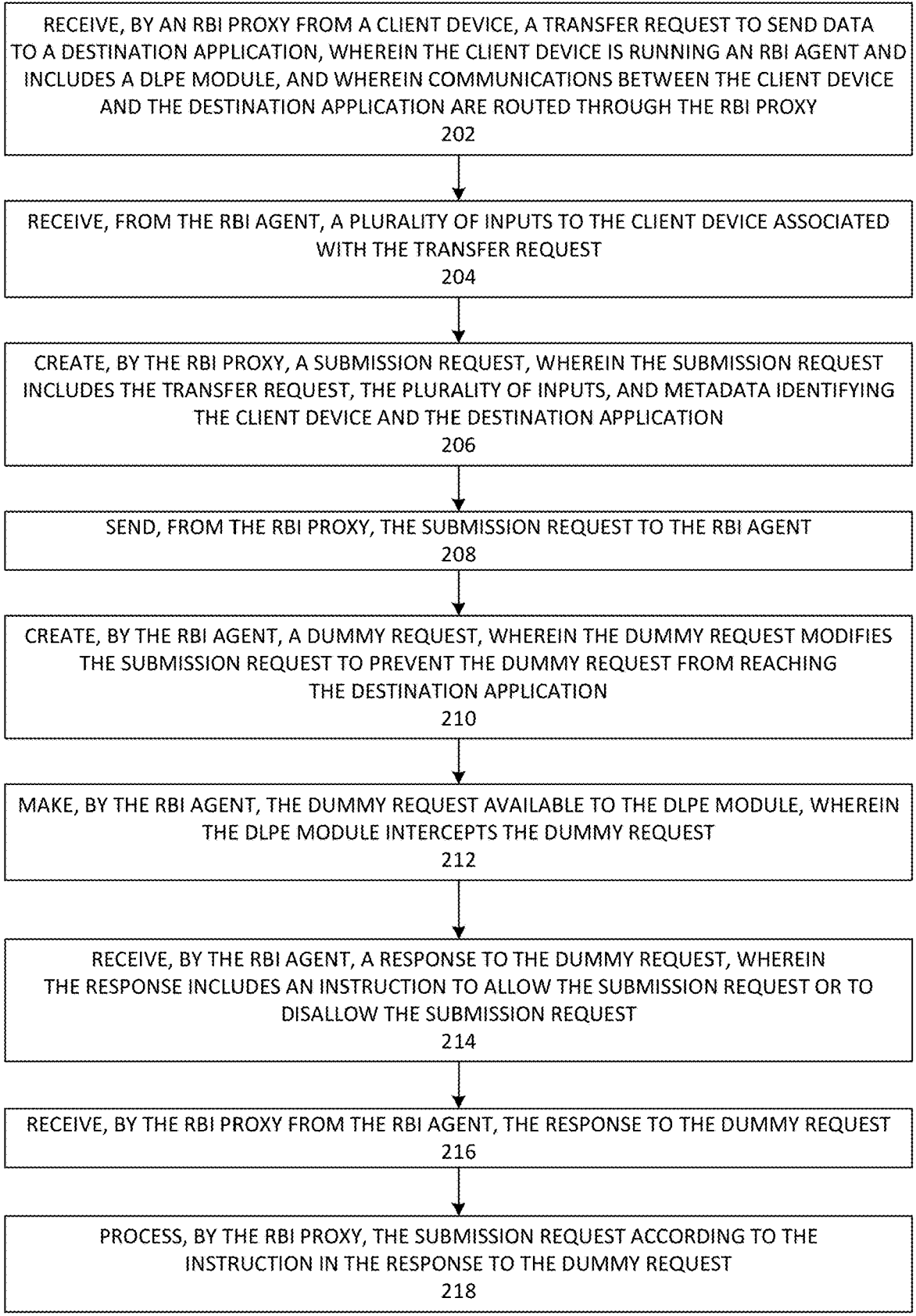
FIG. 2B is a simplified flow diagram of the potential operations of FIG. 2A, in accordance with various embodiments of the present disclosure.

FIG. 2A is a simplified block diagram illustrating potential operations of the example system of FIG. 1 and FIG. 2B is a simplified flow diagram describing the potential operations of FIG. 2A, in accordance with various embodiments of the present disclosure. At 202, a request to transfer data to a destination application (e.g., transfer request 113) is received by an RBI proxy from a client device running an RBI agent and having a DLPe module. Communications between the client device and the destination application are routed through the RBI proxy so that the client device is protected against attacks from the destination application. At 204, the RBI proxy receives from the RBI agent one or more inputs made by the client to the client device. For example, the one or more inputs may include a keystroke, a file selection, a file upload, and a cookie associated with the transfer request or associated with multiple transfer requests to the destination application. The RBI agent collects the client inputs and sends them to the RBI proxy. At 206, the RBI proxy assembles the data associated with the transfer request, including the one or more inputs and metadata identifying the client device and the destination application, and creates a submission request. The submission request may include data associated with the transfer request and may further include any additional data and metadata that the DLPe module may need to determine whether to allow or deny the transfer request. For example, the submission request may include all data (e.g., multiple transfer requests) being sent to the destination application. At 208, the RBI proxy sends the submission request to the RBI agent. At 210, the RBI agent creates a dummy request for the DLPe module to analyze. The dummy request includes the content of the submission request and a modification to prevent the dummy request from reaching the destination application. For example, the dummy request may be modified to add a request header that will be blocked by a network monitoring service, add an invalid port, remove all authentication tokens, or assign an invalid protocol. At 212, the RBI agent makes the dummy request available to the DLPe module. The dummy request may be made available by submitting the dummy request to trigger the DLPe module to intercept the dummy request. The DLPe module analyzes the dummy request and determines whether or not the outbound data transfer to the destination application should be allowed or blocked. At 214, the RBI agent receives a response to the dummy request. The response may instruct whether to allow or disallow the submission request. The RBI agent sends the response to the RBI proxy. At 216, the RBI proxy receives the response. At 218, the RBI proxy processes the submission request in accordance with the instruction provided in the response. For example, if allowed, the RBI proxy sends the submission request to the destination application. If disallowed, the RBI proxy does not send the submission request to the destination application, and may further log the event or notify the network administrator of the event.

Figure 3:
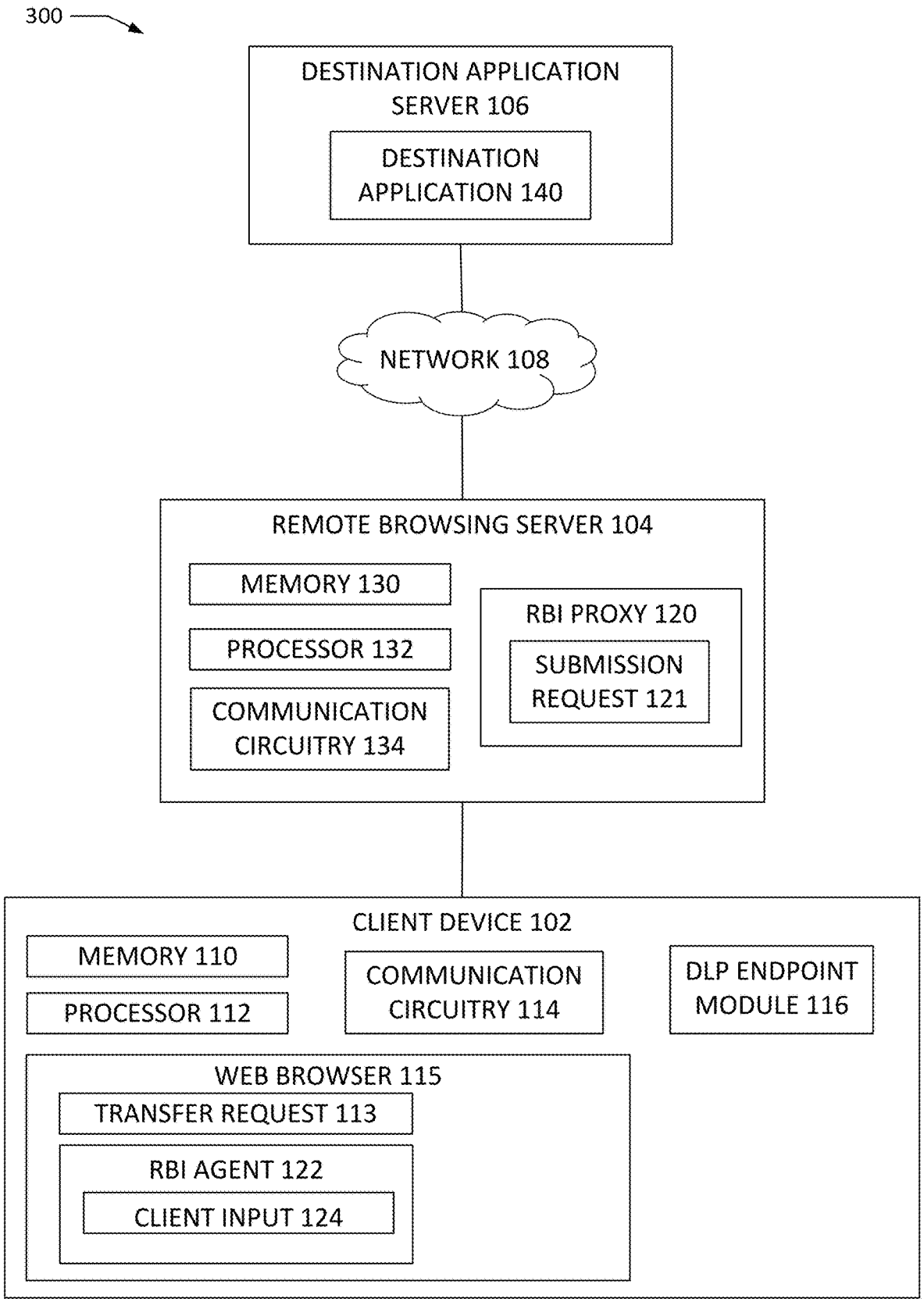
FIG. 3 is block diagram of another example system for detecting data leakage to websites accessed with remote browsing infrastructure, in accordance with various embodiments of the present disclosure.

FIG. 3 is block diagram of another example system for detecting data leakage to websites accessed with remote browsing infrastructure, in accordance with various embodiments of the present disclosure. The communication system 300 of FIG. 3 includes the elements of the communication system 100 of FIG. 1, but does not include a dummy request. Instead, in the communication system 300, the RBI proxy 120 on the remote browsing server 104 communicates directly with the DLPe module 116 on the client device 102. For example, the RBI proxy 120 and the DLPe module 116 may communicate via a pre-selected communication protocol monitored by the DLPe module 116. Further, the DLPe module may analyze the submission request, may determine an action to take with respect to the submission request, and may create a response that includes an instruction for the action to take with respect to the submission request.

Figure 4A:
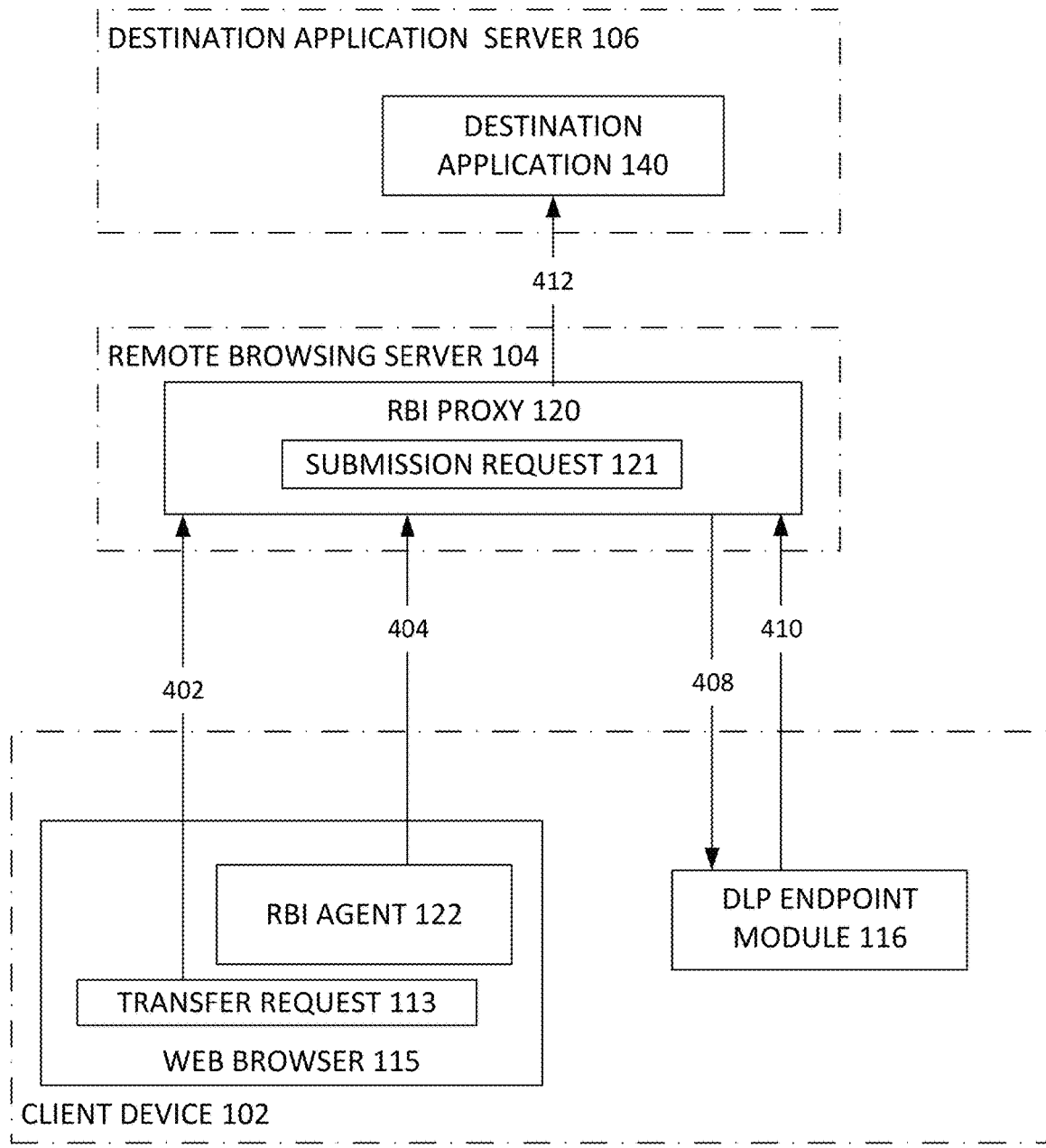
FIG. 4A is a simplified block diagram illustrating potential operations of the example system of FIG. 3, in accordance with various embodiments of the present disclosure.
Figure 4B:
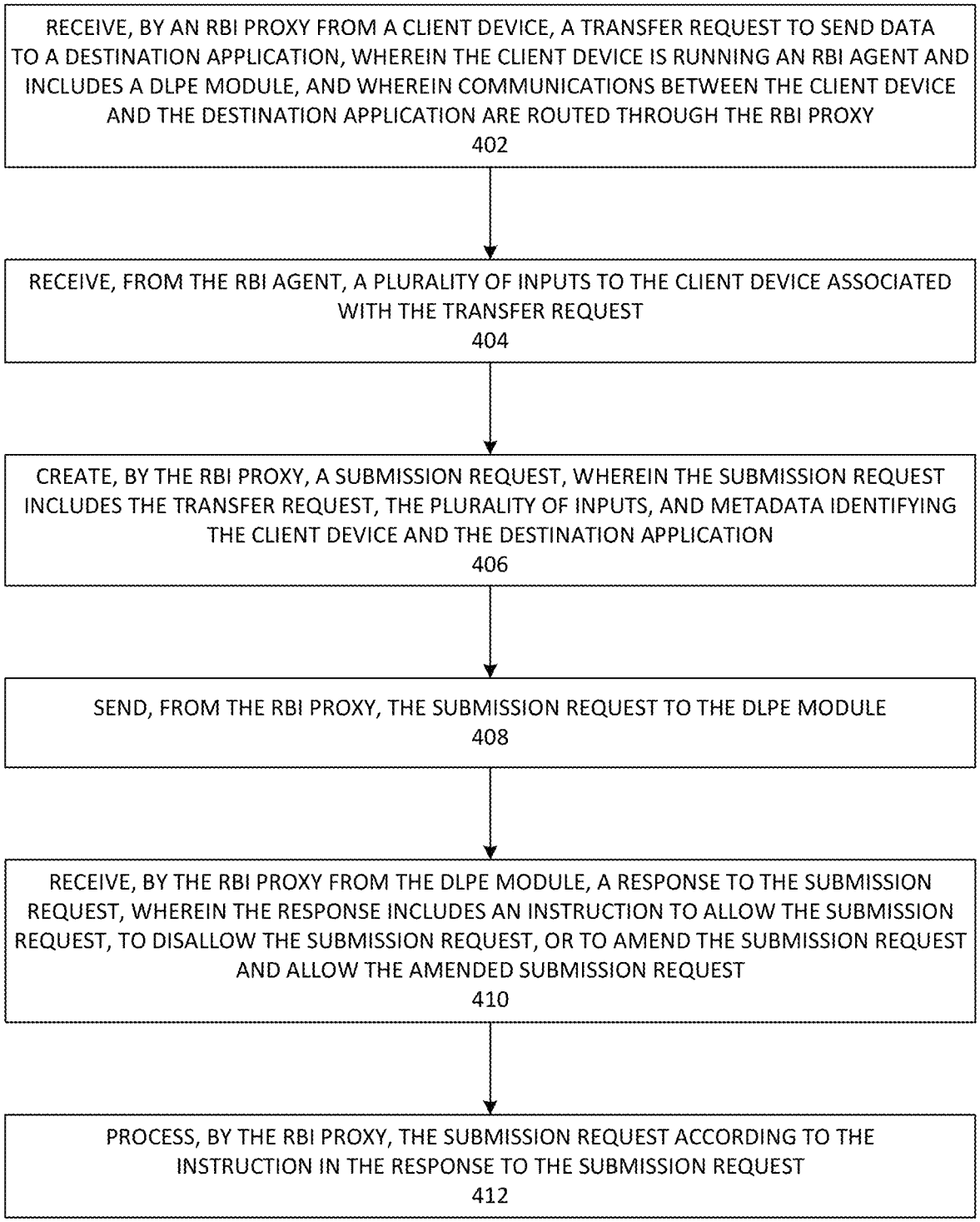
FIG. 4B is a simplified flow diagram of the potential operations of FIG. 4A, in accordance with various embodiments of the present disclosure.

FIG. 4A is a simplified block diagram illustrating potential operations of the example system of FIG. 3 and FIG. 4B is a simplified flow diagram describing the potential operations of FIG. 4A, in accordance with various embodiments of the present disclosure. At 402, a request to transfer data to a destination application (e.g., transfer request 113) is received by an RBI proxy from a client device having an RBI agent and a DLPe module. At 404, the RBI proxy receives a plurality of inputs to the client device collected by and sent from the RBI agent. For example, the one or more inputs may include a keystroke, a file selection, a file upload, and a cookie associated with the transfer request or associated with multiple transfer requests to the destination application. At 406, the RBI proxy assembles the data associated with the transfer request, including the plurality of inputs and associated metadata, for example, metadata identifying the client device and the destination application, and creates a submission request. The submission request may include data associated with the transfer request and may further include any additional data and metadata that the DLPe module may need to determine whether to allow or deny the transfer request. For example, the submission request may include all data (e.g., multiple transfer requests) being sent to the destination application and/or data related to the destination application, such as the URL of the destination application and the URL of the browser page. At 408, the RBI proxy sends the submission request to the DLPe module on the client device 102. The DLPe module analyzes the submission request and determines whether or not to allow the outbound data. At 410, the RBI proxy receives from the DLPe module a response to the submission request with instructions on how to process the submission request. The response may include instructions to allow, disallow, or modify the submission request. At 412, the RBI proxy processes the submission request in accordance with the instruction provided in the response. For example, if allowed, the RBI proxy sends the submission request to the destination application. If disallowed, the RBI proxy does not send the submission request to the destination application, and may further log the event or notify the network administrator of the event. If allowed after amending, the RBI proxy amends the submission request according to the instructions in the response and sends the amended submission request to the destination application. The RBI proxy may further notify the network administrator that a transfer request was made and was amended prior to sending to the destination application.

Figure 5:
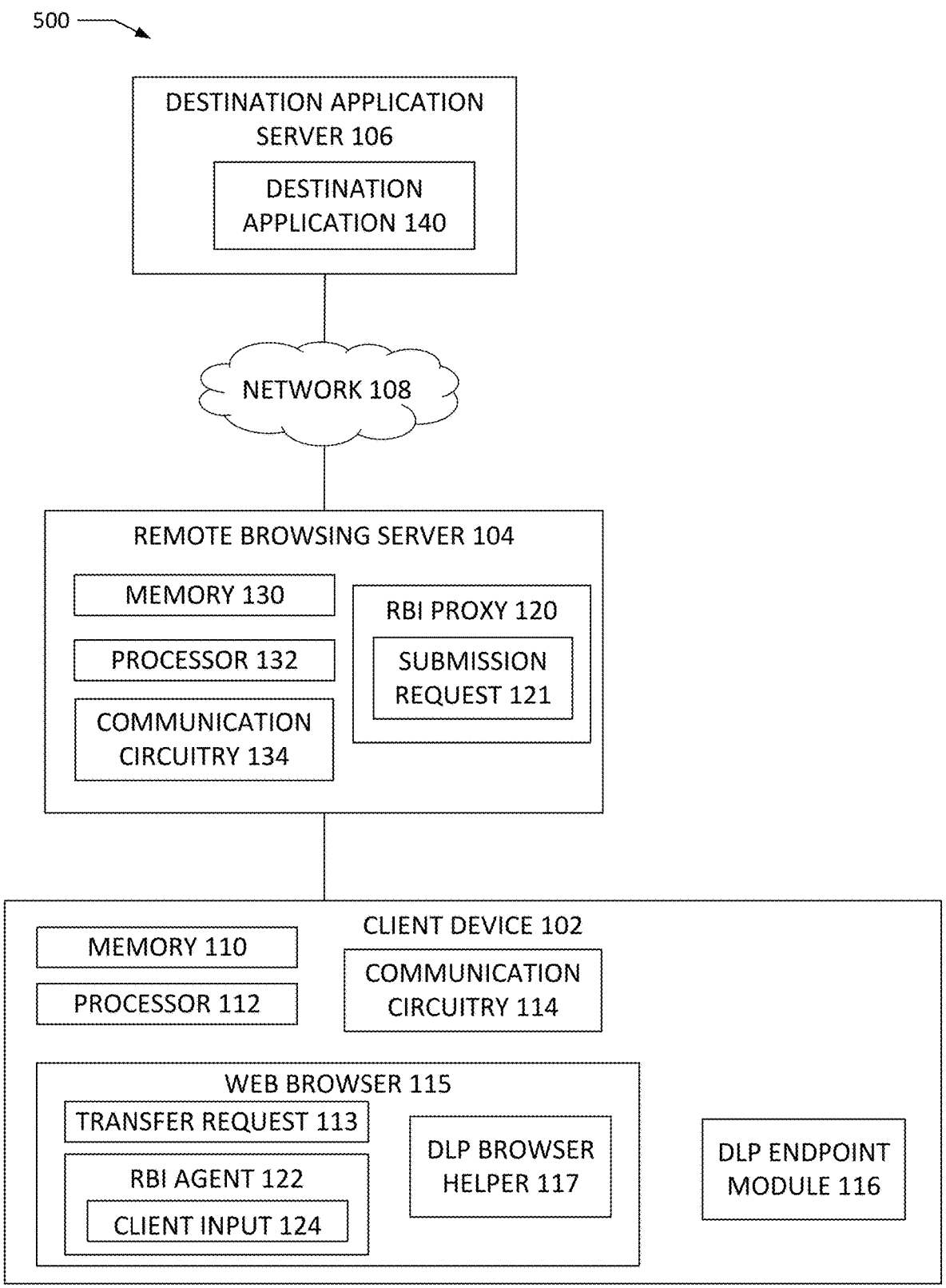
FIG. 5 is block diagram of another example system for detecting data leakage to websites accessed with remote browsing infrastructure, in accordance with various embodiments of the present disclosure.

FIG. 5 is block diagram of another example system for detecting data leakage to websites accessed with remote browsing infrastructure, in accordance with various embodiments of the present disclosure. The communication system 500 of FIG. 5 includes the elements of the communication system 100 of FIG. 1, but does not include a dummy request and further includes a DLP browser helper 117 on the client device 102. In the communication system 500, the RBI agent 122 communicates with the DLP browser helper 117 and the DLP browser helper 117 communicates with the DLPe module 116 on the client device 102.

Figure 6A:
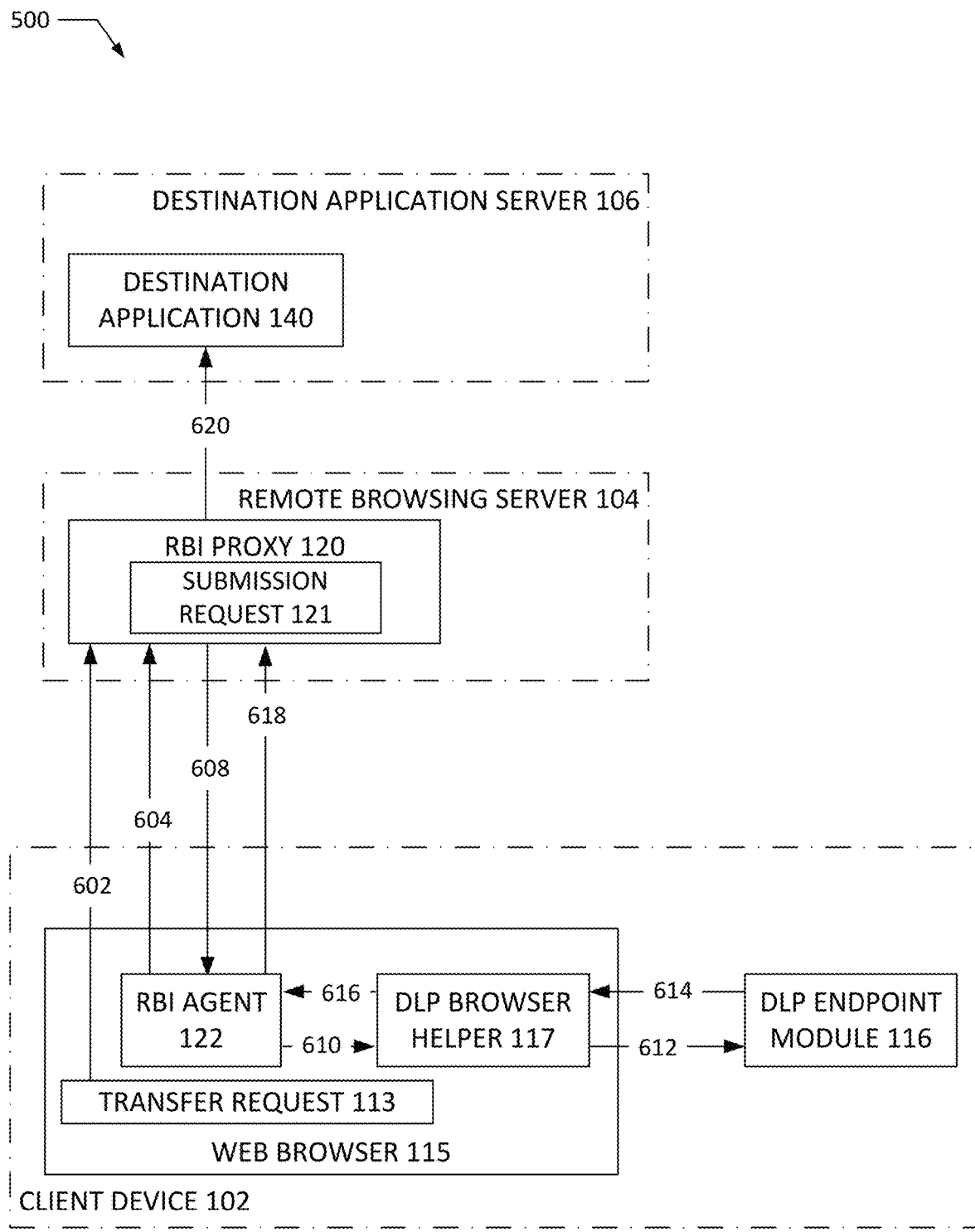
FIG. 6A is a simplified block diagram illustrating potential operations of the example system of FIG. 5, in accordance with various embodiments of the present disclosure.
Figure 6B:
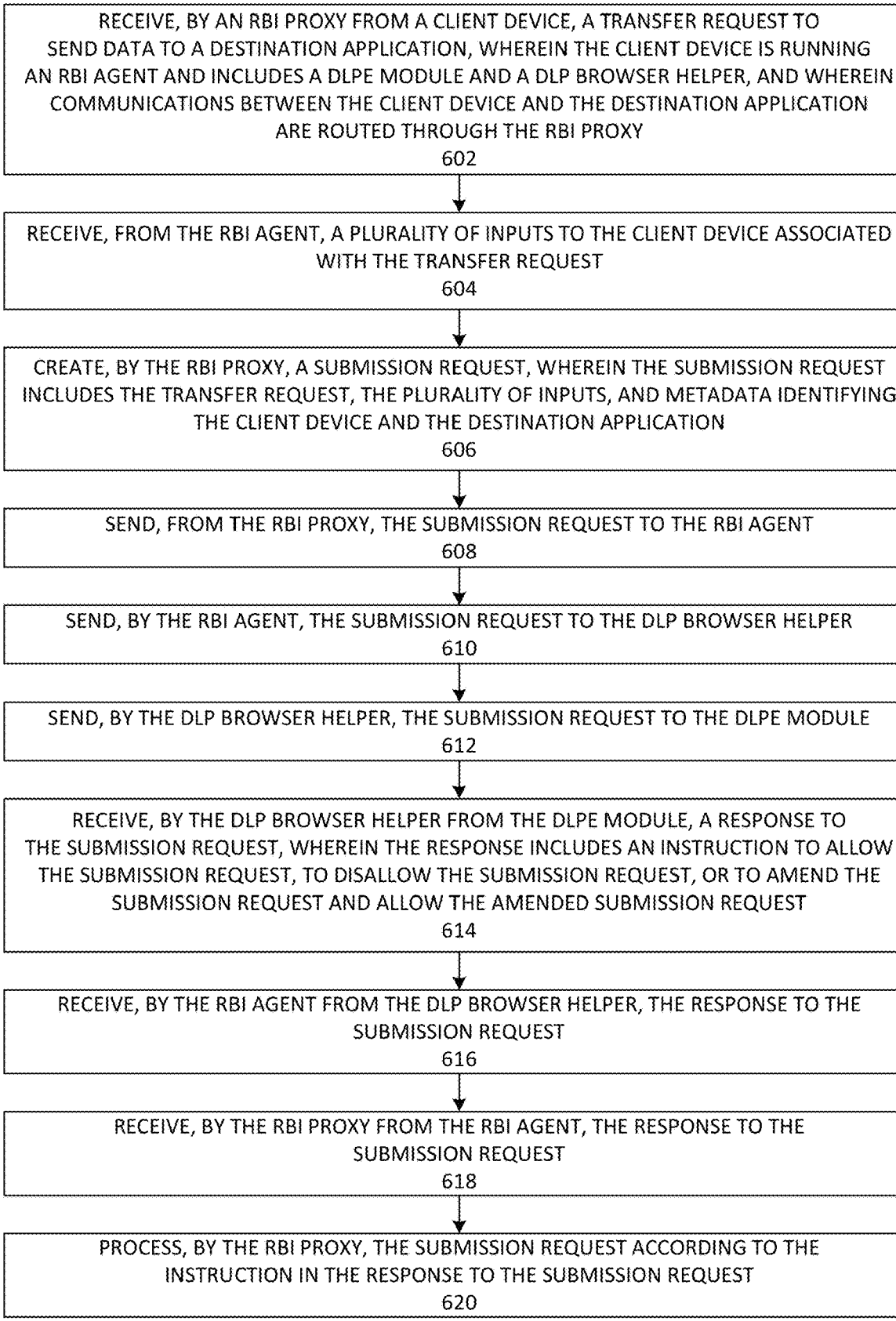
FIG. 6B is a simplified flow diagram of the potential operations of FIG. 6A, in accordance with various embodiments of the present disclosure.

FIG. 6A is a simplified block diagram illustrating potential operations of the example system of FIG. 5 and FIG. 6B is a simplified flow diagram describing the potential operations of FIG. 6A, in accordance with various embodiments of the present disclosure. At 602, a request to transfer data to a destination application (e.g., transfer request 113) is received by an RBI proxy from a client device having an RBI agent and a DLPe module. At 604, the RBI proxy receives a plurality of inputs to the client device collected by and sent from the RBI agent. For example, the one or more inputs may include a keystroke, a file selection, a file upload, and a cookie associated with the transfer request or associated with multiple transfer requests to the destination application. At 606, the RBI proxy creates a submission request. The submission request may include data associated with the transfer request and may further include any additional data and metadata that the DLPe module may need to determine whether to allow or deny the transfer request. For example, the submission request may include all data (e.g., multiple transfer requests) being sent to the destination application and/or data related to the destination application, such as the URL of the destination application and the URL of the browser page. At 608, the RBI proxy sends the submission request to the RBI agent on the client device 102. At 610, the RBI agent sends the submission request to the DLP browser helper. At 612, the DLP browser helper sends the submission request to the DLPe module. The DLPe module analyzes the submission request and determines whether or not to allow the outbound data. At 614, the DLP browser helper receives from the DLPe module a response to the submission request with instructions on how to process the submission request. The response may include instructions to allow, deny, or modify the submission request. At 616, the RBI agent receives the response from the DLP browser helper. At 618, the RBI proxy receives the response from the RBI agent. At 620, the RBI proxy processes the submission request in accordance with the instruction provided in the response.

Figure 7:
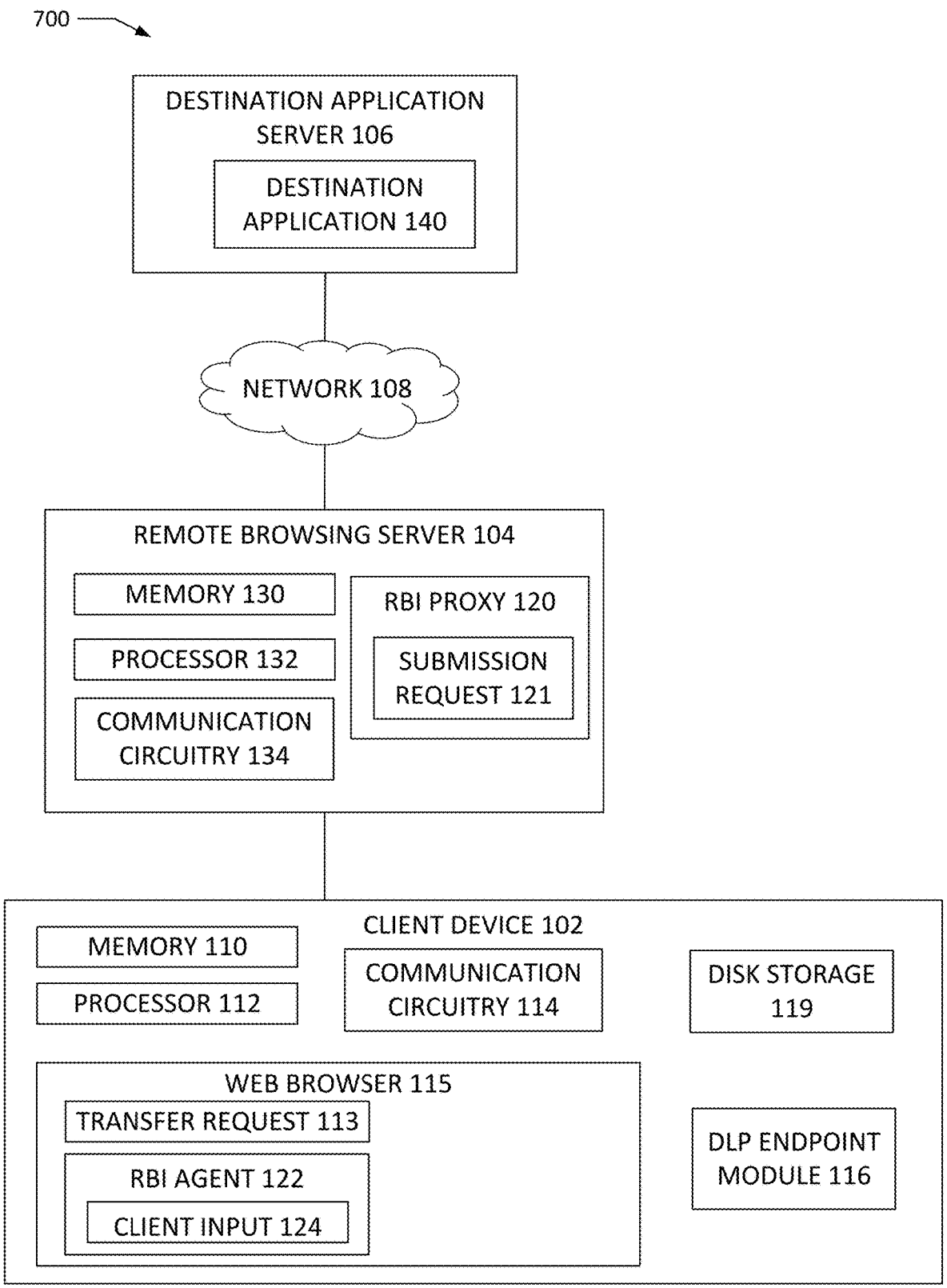
FIG. 7 is block diagram of another example system for detecting data leakage to websites accessed with remote browsing infrastructure, in accordance with various embodiments of the present disclosure.

FIG. 7 is block diagram of another example system for detecting data leakage to websites accessed with remote browsing infrastructure, in accordance with various embodiments of the present disclosure. The communication system 700 of FIG. 7 includes the elements of the communication system 100 of FIG. 1, but does not include a dummy request and further includes disk storage 119 on the client device 102. In the communication system 700, the RBI agent 122 interfaces with the DLPe module 116 via disk storage 119 on the client device 102. In communication system 700, the RBI agent 122 writes the submission request 121 received from the RBI proxy to a first location in disk storage 119. The DLPe module 116 retrieves the submission request 121 from the first location in disk storage 119, analyzes the submission request 121, and writes a response to the submission request to a second location in disk storage. The RBI agent 122 retrieves the response from the second location in disk storage and sends the response to the RBI proxy 120. In some embodiments, the first and the second locations in storage are the same. In some embodiments, the first location in storage is different than the second location in storage.

Figure 8A:
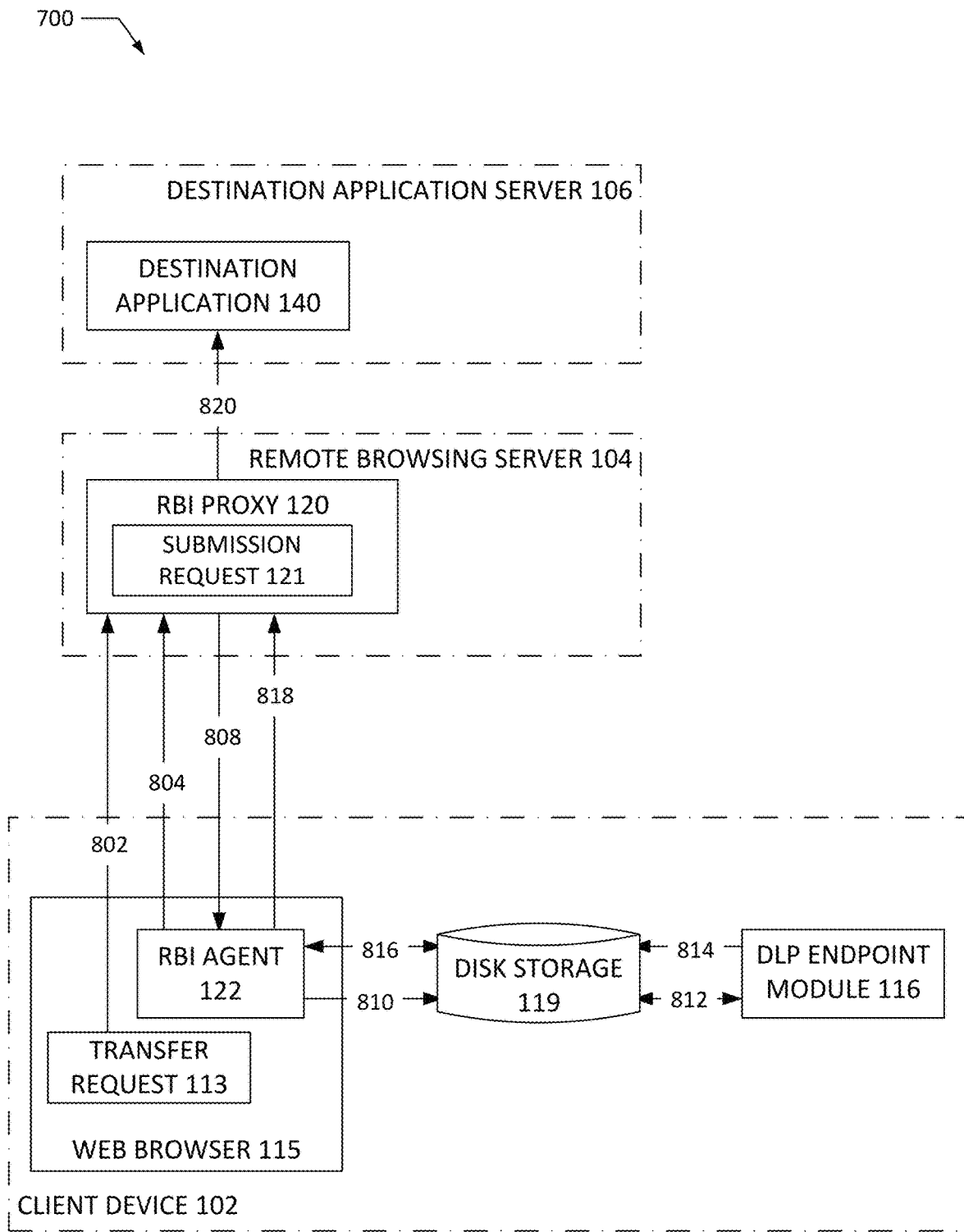
FIG. 8A is a simplified block diagram illustrating potential operations of the example system of FIG. 5, in accordance with various embodiments of the present disclosure.
Figure 8B:
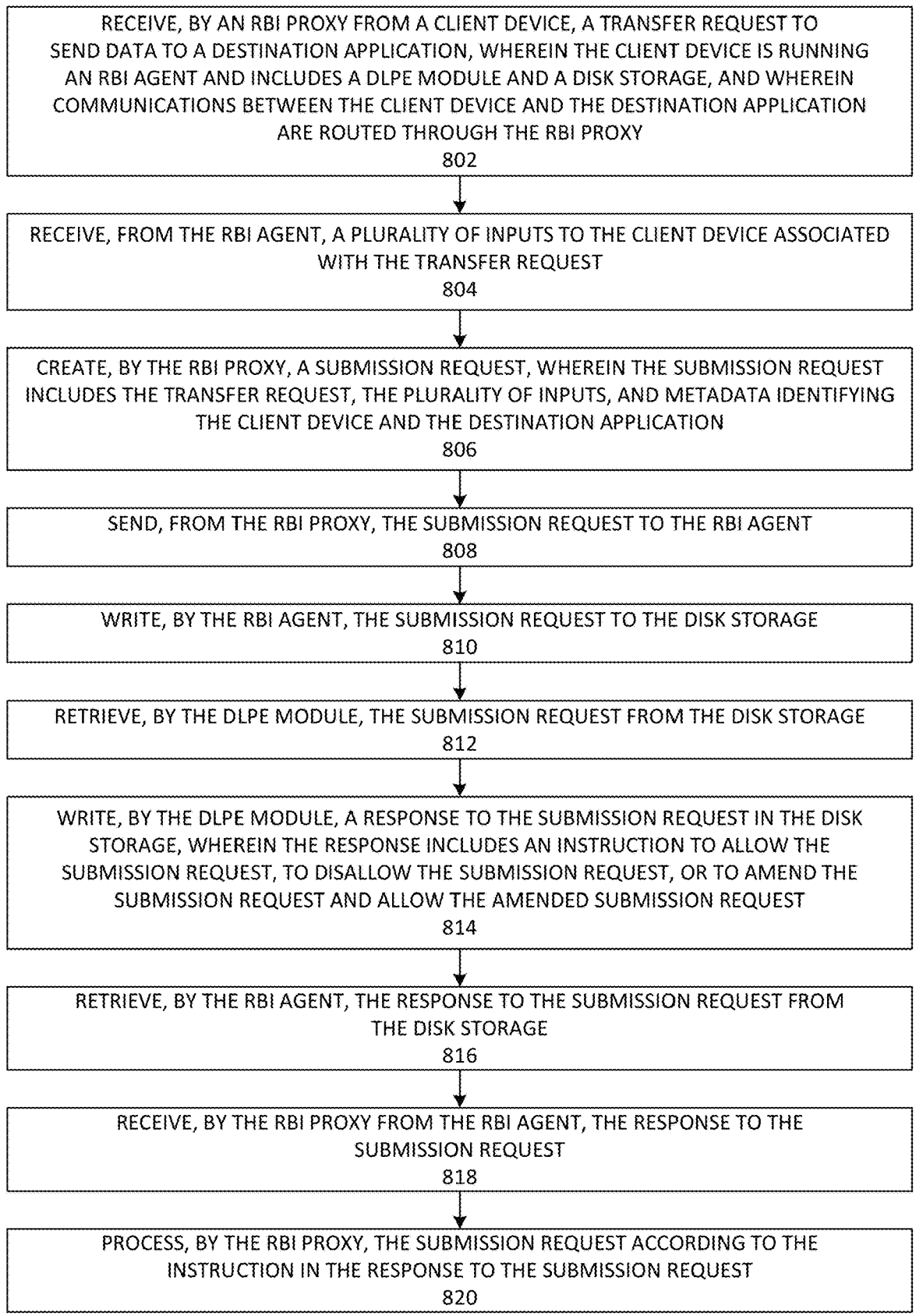
FIG. 8B is a simplified flow diagram of the potential operations of FIG. 8A, in accordance with various embodiments of the present disclosure.

FIG. 8A is a simplified block diagram illustrating potential operations of the example system of FIG. 7 and FIG. 8B is a simplified flow diagram describing the potential operations of FIG. 8A, in accordance with various embodiments of the present disclosure. At 802, a request to transfer data to a destination application (e.g., transfer request 113) is received by an RBI proxy from a client device having an RBI agent and a DLPe module. At 804, the RBI proxy receives a plurality of inputs to the client device collected by and sent from the RBI agent. For example, the one or more inputs may include a keystroke, a file selection, a file upload, and a cookie associated with the transfer request or associated with multiple transfer requests to the destination application. At 806, the RBI proxy creates a submission request. The submission request may include data associated with the transfer request and may further include any additional data and metadata that the DLPe module may need to determine whether to allow or deny the transfer request. For example, the submission request may include all data (e.g., multiple transfer requests) being sent to the destination application. At 808, the RBI proxy sends the submission request to the RBI agent on the client device 102. At 810, the RBI agent writes the submission request to a location in disk storage. For example, the RBI agent writes the submission request to a location in the disk storage known to the DLPe module so that the DLPe module may retrieve the submission request.

The RBI agent may further write the submission request in a format known to the DLPe module. At 812, the DLPe module retrieves the submission request from the location in the disk storage. The DLPe module analyzes the submission request, for example, against a configured policy, and determines whether or not to allow the submission request. At 814, the DLPe module writes a response to a location in disk storage known to the RBI agent so that the RBI agent may retrieve the response from the disk storage. The response may include instructions on how to process the submission request, such as, allow, deny, or modify the submission request. At 816, the RBI agent retrieves the response from the location in the disk storage. At 818, the RBI proxy receives the response from the RBI agent. At 820, the RBI proxy processes the submission request in accordance with the instruction provided in the response.

Figure 9:
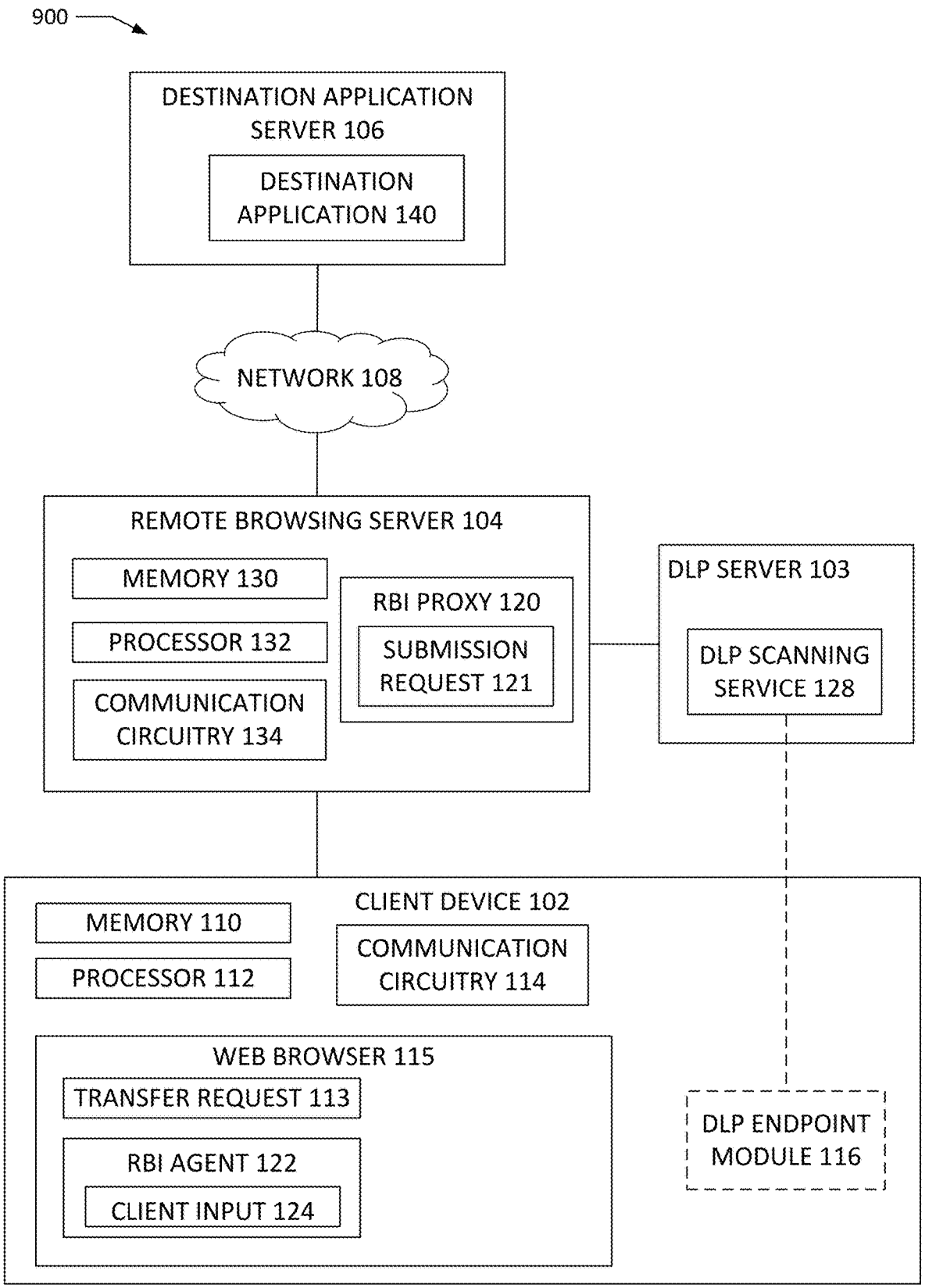
FIG. 9 is block diagram of another example system for detecting data leakage to websites accessed with remote browsing infrastructure, in accordance with various embodiments of the present disclosure.

FIG. 9 is block diagram of another example system for detecting data leakage to websites accessed with remote browsing infrastructure, in accordance with various embodiments of the present disclosure. The communication system 900 of FIG. 9 includes the elements of the communication system 100 of FIG. 1, but does not include a dummy request, may not include a DLPe module 116 (i.e., the DLPe module 116 is optional as indicated by the dotted lines), and further includes a DLP server 103 having a DLP scanning service 128. The DLP scanning service 128 may analyze the submission request 121 and determine whether to allow or disallow the submission request 121. In some embodiments, the DLP scanning service 128 may create a response to the submission request that provides instructions to the RBI proxy. In communication system 900, the RBI proxy 120 directly communicates with the DLP server 103 and the DLP scanning service 128, for example, via network 108 or via a pre-selected communication channel. When communication system 900 includes a DLPe module 116 on the client device 102, the DLPe module 116 communicates with the DLP server 103, for example, via network 108 or via a pre-selected communication channel. In communication system 900, the RBI proxy 120 receives the response to the submission request from the DLP scanning service 128.

Figure 10A:
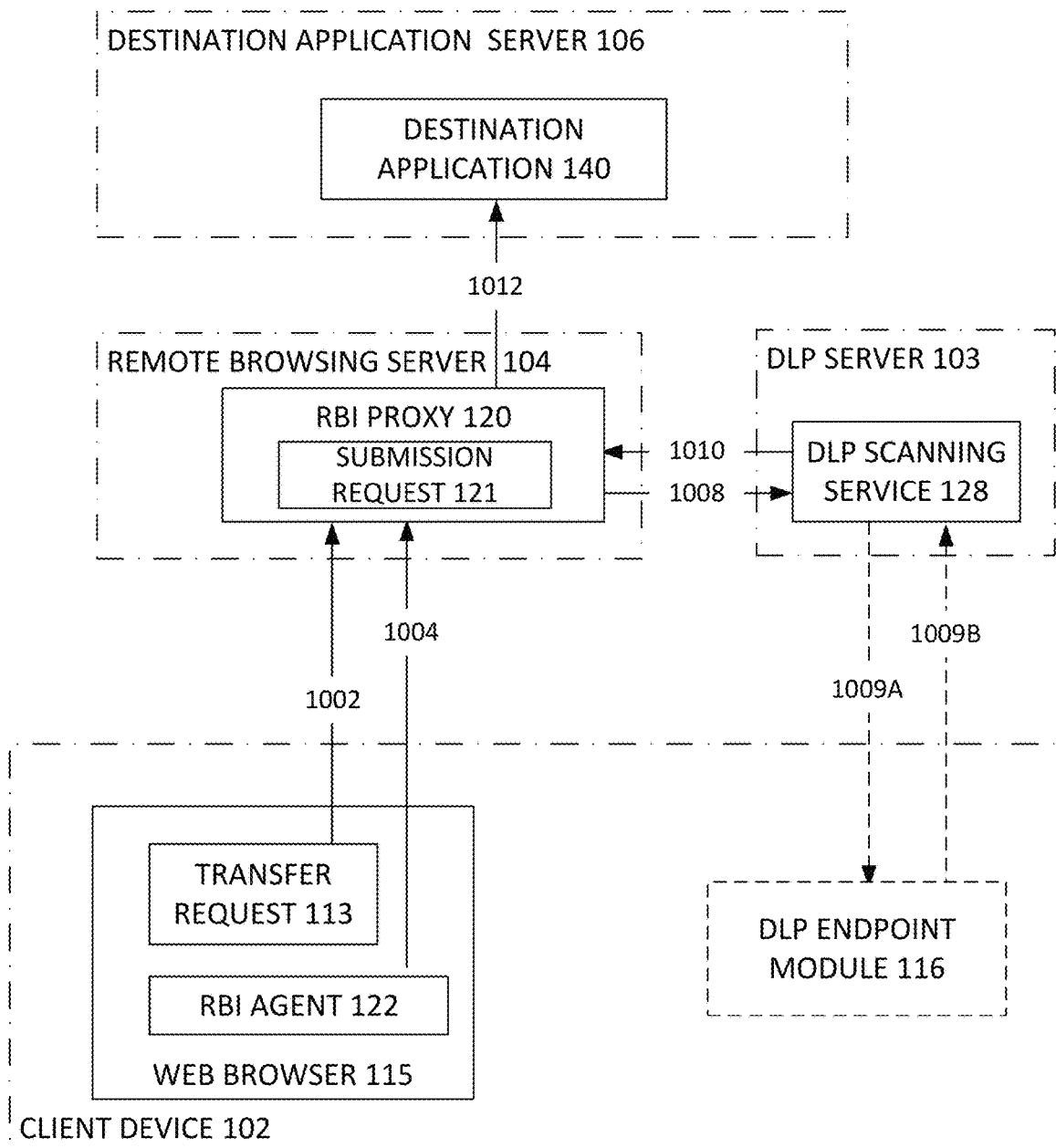
FIG. 10A is a simplified block diagram illustrating potential operations of the example system of FIG. 5, in accordance with various embodiments of the present disclosure.
Figure 10B:
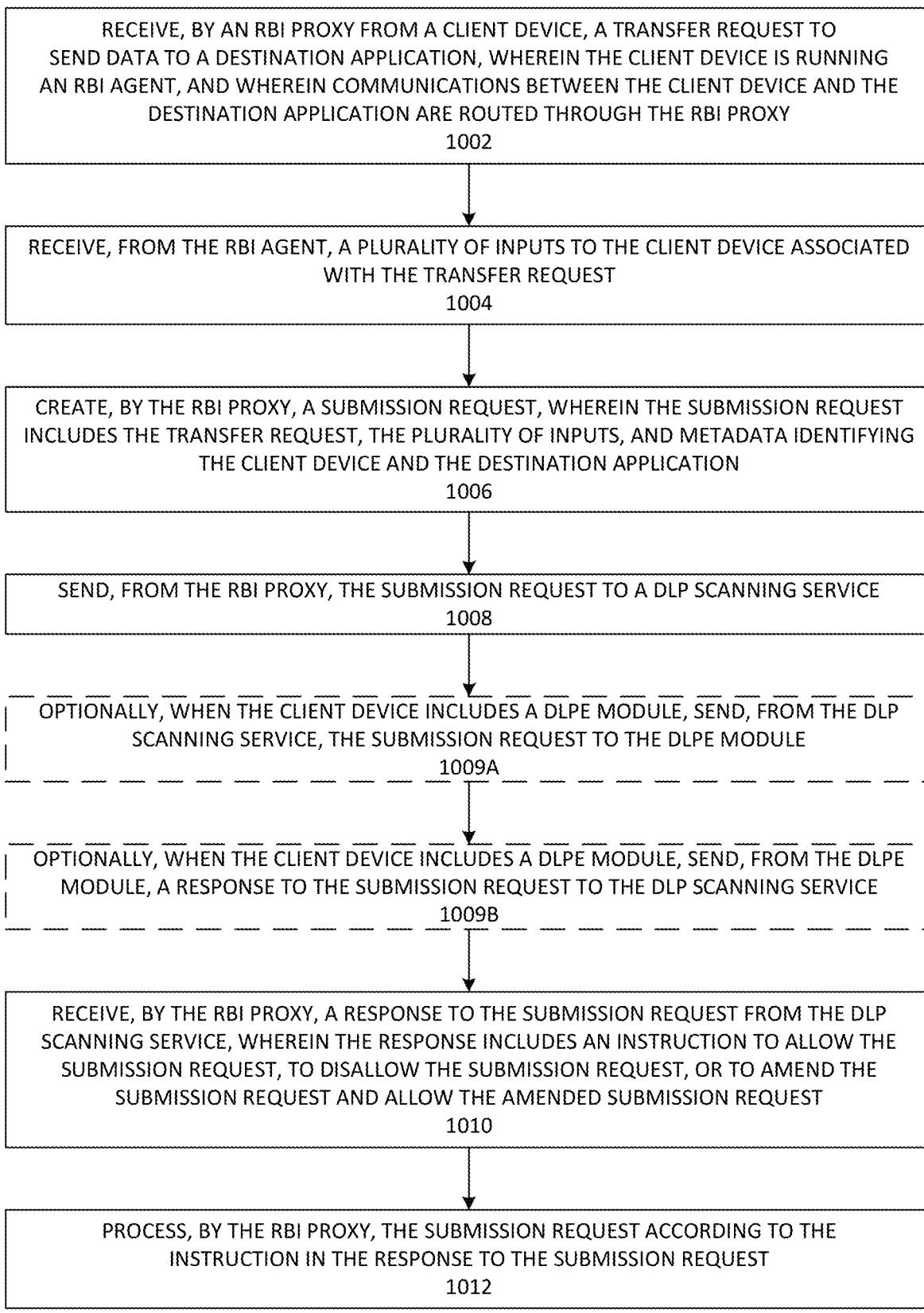
FIG. 10B is a simplified flow diagram of the potential operations of FIG. 10A, in accordance with various embodiments of the present disclosure.

FIG. 10A is a simplified block diagram illustrating potential operations of the example system of FIG. 9 and FIG. 10B is a simplified flow diagram describing the potential operations of FIG. 10A, in accordance with various embodiments of the present disclosure. At 1002, a request to transfer data to a destination application (e.g., transfer request 113) is received by an RBI proxy from a client device having an RBI agent and, optionally, a DLPe module. At 1004, the RBI proxy receives a plurality of inputs to the client device collected by and sent from the RBI agent. For example, the one or more inputs may include a keystroke, a file selection, a file upload, and a cookie associated with the transfer request or associated with multiple transfer requests to the destination application. At 1006, the RBI proxy creates a submission request. The submission request may include data associated with the transfer request and may further include any additional data and metadata that the DLP scanning service and/or DLPe module, if present, may need to determine whether to allow or deny the transfer request. For example, the submission request may include all data (e.g., multiple transfer requests) being sent to the destination application. At 1008, the RBI proxy sends the submission request to the DLP scanning service on the DLP server. The DLP scanning service analyzes the submission request, for example, against a configured policy, and determines whether or not to allow the submission request. At 1009A, optionally, if the client device includes the DLPe module, the DLP scanning service may send the submission request to the DLPe module. The DLPe module analyzes the submission request, for example, against a configured policy, and determines whether or not to allow the submission request. At 1009B, optionally, the DLPe module may send a response to the DLP scanning service. At 1010, the RBI proxy receives the response to the submission request from the DLP scanning service. The response may include instructions on how to process the submission request, such as, allow, deny, or modify the submission request. At 1012, the RBI proxy processes the submission request in accordance with the instruction provided in the response.

Figure 11:
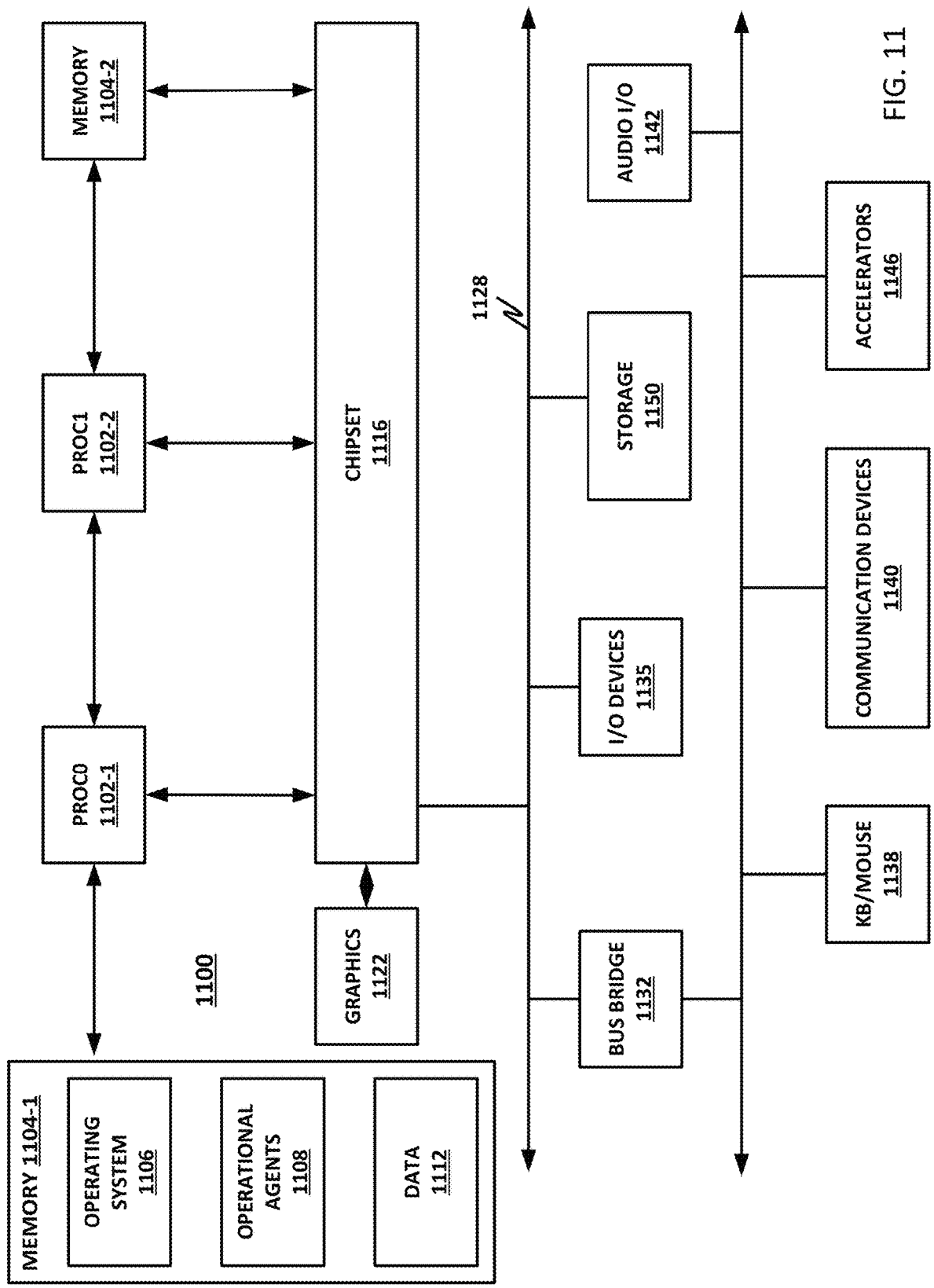
FIG. 11 is a block diagram of selected elements of a hardware platform.

FIG. 11 is a block diagram of a hardware platform 1100. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1100, even though they may be scattered across a data center, or even located in different data centers.

Hardware platform 1100 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1100 is arranged in a point-to-point (PtP) configuration. This PtP configuration is popular for personal computer (PC) and server-type devices, although it is not so limited, and any other bus type may be used.

Hardware platform 1100 is an example of a platform that may be used to implement embodiments of the teachings of this specification. For example, instructions could be stored in storage 1150. Instructions could also be transmitted to the hardware platform in an ethereal form, such as via a network interface, or retrieved from another source via any suitable interconnect. Once received (from any source), the instructions may be loaded into memory 1104, and may then be executed by one or more processor 1102 to provide elements such as an operating system 1106, operational agents 1108, or data 1112.

Hardware platform 1100 may include several processors 1102. For simplicity and clarity, only processors PROC0 1102-1 and PROC1 1102-2 are shown. Additional processors (such as 2, 4, 8, 16, 24, 32, 64, or 128 processors) may be provided as necessary, while in other embodiments, only one processor may be provided. Details of processors 1102 are not illustrated in this FIGURE. Processors may have any number of cores, such as 1, 2, 4, 8, 16, 24, 32, 64, or 128 cores.

Processors 1102 may be any type of processor and may communicatively couple to chipset 1116 via, for example, PtP interfaces. Chipset 1116 may also exchange data with other elements, such as a high-performance graphics adapter 1122. In alternative embodiments, any or all of the PtP links illustrated in FIG. 11 could be implemented as any type of bus, or other configuration rather than a PtP link. In various embodiments, chipset 1116 may reside on the same die or package as a processor 1102 or on one or more different dies or packages. Each chipset may support any suitable number of processors 1102. A chipset 1116 (which may be a chipset, uncore, Northbridge, Southbridge, or other suitable logic and circuitry) may also include one or more controllers to couple other components to one or more CPUs.

Two memories, 1104-1 and 1104-2 are shown, connected to PROC0 1102-1 and PROC1 1102-2, respectively. As an example, each processor is shown connected to its memory in a direct memory access (DMA) configuration, though other memory architectures are possible, including ones in which memory 1104 communicates with processor 1102 via a bus. For example, some memories may be connected via a system bus, or in a data center, memory may be accessible in a remote DMA (RDMA) configuration.

Memory 1104 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1104 may be used for short, medium, and/or long-term storage. Memory 1104 may store any suitable data or information utilized by platform logic. In some embodiments, memory 1104 may also comprise storage for instructions that may be executed by the cores of processors 1102 or other processing elements (e.g., logic resident on chipsets 1116) to provide functionality.

In certain embodiments, memory 1104 may comprise a relatively low-latency volatile main memory, while storage 1150 may comprise a relatively higher-latency nonvolatile memory. However, memory 1104 and storage 1150 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1104 and storage 1150, for example, in a single physical memory device, and in other cases, memory 1104 and/or storage 1150 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1122 may be configured to provide a human-readable visual output, such as a command-line interface (CLI) or graphical desktop such as Microsoft Windows, Apple OSX desktop, or a Unix/Linux X Window System-based desktop. Graphics adapter 1122 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1122 may include a hardware graphics card, which may have its own memory and its own graphics processing unit (GPU).

Chipset 1116 may be in communication with a bus 1128 via an interface circuit. Bus 1128 may have one or more devices that communicate over it, such as a bus bridge 1132, I/O devices 1135, accelerators 1146, communication devices 1140, and a keyboard and/or mouse 1138, by way of nonlimiting example. In general terms, the elements of hardware platform 1100 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1140 can broadly include any communication not covered by a network interface and the various I/O devices described herein. This may include, for example, various USB, FireWire, Lightning, or other serial or parallel devices that provide communications.

I/O Devices 1135 may be configured to interface with any auxiliary device that connects to hardware platform 1100 but that is not necessarily a part of the core architecture of hardware platform 1100. A peripheral may be operable to provide extended functionality to hardware platform 1100, and may or may not be wholly dependent on hardware platform 1100. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 1142 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1132 may be in communication with other devices such as a keyboard/mouse 1138 (or other input devices such as a touch screen, trackball, etc.), communication devices 1140 (such as modems, network interface devices, peripheral interfaces such as PCI or PCIe, or other types of communication devices that may communicate through a network), audio I/O 1142, and/or accelerators 1146. In alternative embodiments, any portions of the bus architectures could be implemented with one or more PtP links.

Operating system 1106 may be, for example, Microsoft Windows, Linux, UNIX, Mac OS X, iOS, MS-DOS, or an embedded or real-time operating system (including embedded or real-time flavors of the foregoing). In some embodiments, a hardware platform 1100 may function as a host platform for one or more guest systems that invoke application (e.g., operational agents 1108).

Operational agents 1108 may include one or more computing engines that may include one or more non-transitory computer-readable mediums having stored thereon executable instructions operable to instruct a processor to provide operational functions. At an appropriate time, such as upon booting hardware platform 1100 or upon a command from operating system 1106 or a user or security administrator, processor 1102 may retrieve a copy of the operational agent (or software portions thereof) from storage 1150 and load it into memory 1104. Processor 1102 may then iteratively execute the instructions of operational agents 1108 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1100 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1100 may be virtualized, in particular the processor(s) and memory. For example, a virtualized environment may run on OS 1106, or OS 1106 could be replaced with a hypervisor or virtual machine manager. In this configuration, a virtual machine running on hardware platform 1100 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

Figure 12:
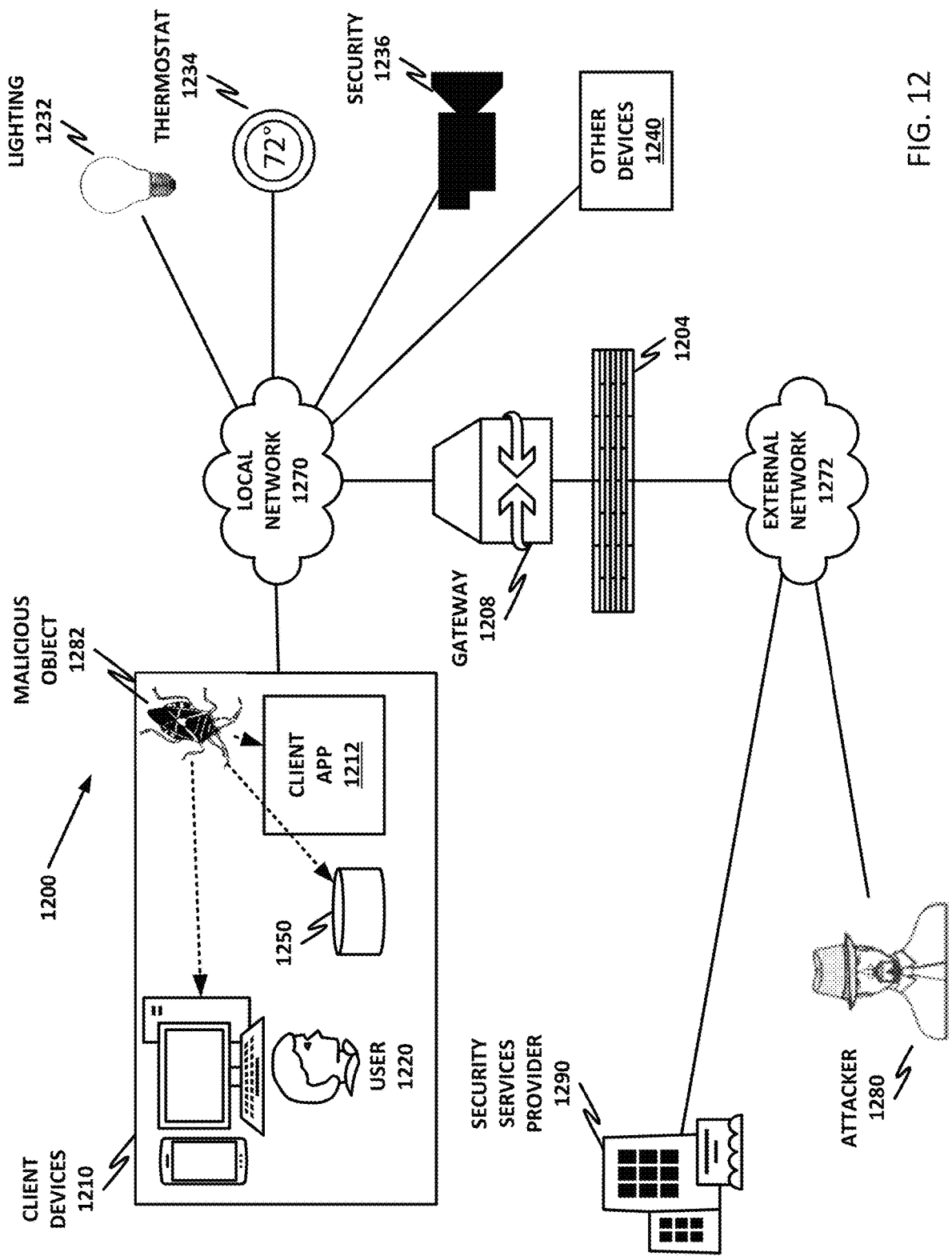
FIG. 12 is a block diagram of a security ecosystem 1200.

FIG. 12 is a block diagram of a security ecosystem 1200. In the example of FIG. 12, security ecosystem 2100 may be an enterprise, a government entity, a data center, a telecommunications provider, a "smart home" with computers, smart phones, and various internet of things (IoT) devices, or any other suitable ecosystem. Security ecosystem 1200 is provided herein as an illustrative and nonlimiting example of a system that may employ, and benefit from, the teachings of the present specification.

Within security ecosystem 1200, one or more users 1220 operate one or more client devices 1210. A single user 1220 and single client device 1210 are illustrated here for simplicity, but a home or enterprise may have multiple users, each of which may have multiple devices, such as desktop computers, laptop computers, smart phones, tablets, hybrids, or similar.

Client devices 1210 may be communicatively coupled to one another and to other network resources via local network 1270. Local network 1270 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 1270 may also include one or more servers, firewalls, routers, switches, security appliances, antivirus servers, or other network devices, which may be single-purpose appliances, virtual machines, containers, or functions. Some functions may be provided on client devices 1210.

In this illustration, local network 1270 is shown as a single network for simplicity, but in some embodiments, local network 1270 may include any number of networks, such as one or more intranets connected to the internet. Local network 1270 may also provide access to an external network, such as the internet, via external network 1272. External network 1272 may similarly be any suitable type of network.

Local network 1270 may connect to the internet via gateway 1208, which may be responsible, among other things, for providing a logical boundary between local network 1270 and external network 1272. Local network 1270 may also provide services such as dynamic host configuration protocol (DHCP), gateway services, router services, and switching services, and may act as a security portal across local boundary 1204.

In some embodiments, gateway 1208 may be a standalone internet appliance. Such embodiments are popular in cases in which ecosystem 1200 includes a home or small business. In other cases, gateway 1208 may run as a virtual machine or in another virtualized manner. In larger enterprises that features service function chaining (SFC) or network function virtualization (NFV), gateway 1208 may be include one or more service functions and/or virtualized network functions.

Local network 1270 may also include a number of discrete IoT devices. For example, local network 1270 may include IoT functionality to control lighting 1232, thermostats or other environmental controls 1234, a security system 1236, and any number of other devices 1240. Other devices 1240 may include, as illustrative and nonlimiting examples, network attached storage (NAS), computers, printers, smart televisions, smart refrigerators, smart vacuum cleaners and other appliances, and network connected vehicles.

Local network 1270 may communicate across local boundary 1204 with external network 1272. Local boundary 1204 may represent a physical, logical, or other boundary. External network 1272 may include, for example, websites, servers, network protocols, and other network-based services. In one example, an attacker 1280 (or other similar malicious or negligent actor) also connects to external network 1272. A security services provider 1290 may provide services to local network 1270, such as security software, security updates, network appliances, or similar. For example, MCAFEE, LLC provides a comprehensive suite of security services that may be used to protect local network 1270 and the various devices connected to it.

It may be a goal of users 1220 to successfully operate devices on local network 1270 without interference from attacker 1280. In one example, attacker 1280 is a malware author whose goal or purpose is to cause malicious harm or mischief, for example, by injecting malicious object 1282 into client device 1210. Once malicious object 1282 gains access to client device 1210, it may try to perform work such as social engineering of user 1220, a hardware-based attack on client device 1210, modifying storage 1250 (or volatile memory), modifying client application 1212 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 1280 to leverage against local network 1270.

Malicious harm or mischief may take the form of installing root kits or other malware on client devices 1210 to tamper with the system, installing spyware or adware to collect personal and commercial data, defacing websites, operating a botnet such as a spam server, or simply to annoy and harass users 1220. Thus, one aim of attacker 1280 may be to install his malware on one or more client devices 1210 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 1280 may also want to commit industrial or other espionage, such as stealing classified or proprietary data, stealing identities, or gaining unauthorized access to enterprise resources. Thus, attacker's strategy may also include trying to gain physical access to one or more client devices 1210 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 1280. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 1270 may contract with or subscribe to a security services provider 1290, which may provide security services, updates, antivirus definitions, patches, products, and services. MCAFEE, LLC is a nonlimiting example of such a security services provider that offers comprehensive security and antivirus solutions. In some cases, security services provider 1290 may include a threat intelligence capability such as McAfee's GTI database, or similar product. Security services provider 1290 may update its threat intelligence database by analyzing new candidate malicious objects as they appear on client networks and characterizing them as malicious or benign.

Other security considerations within security ecosystem 1200 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

EXAMPLE IMPLEMENTATIONS

The following paragraphs provide various examples of the embodiments disclosed herein.

Example 1 is an apparatus, including one or more memory elements operable to store instructions; and one or more processors operable to execute the instructions, such that the apparatus is configured to receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy; receive, from the RBI agent, a plurality of inputs to the client device associated with the transfer request; create, by the RBI proxy, a submission request, wherein the submission request includes the plurality of inputs and associated metadata; send, from the RBI proxy, the submission request to the RBI agent; create, by the RBI agent, a dummy request, wherein the dummy request modifies the submission request to prevent the submission request from reaching the destination application; receive, by the RBI agent from the DLPe module, a response to the dummy request, wherein the response includes an instruction to allow the submission request or to disallow the submission request; receive, by the RBI proxy from the RBI agent, the response to the dummy request; and process, by the RBI proxy, the submission request according to the instruction in the response to the dummy request.

Example 2 may include the subject matter of Example 1, and may further specify that the dummy request modifies the submission request by adding a request header that will be blocked by a network monitoring service, by adding an invalid port to a Uniform Resource Locator (URL), by adding an invalid component to a host name in the URL, by removing one or more authentication tokens, or by assigning an invalid protocol.

Example 3 may include the subject matter of any of Examples 1 and 2, and may further specify that the plurality of inputs to the client device include one or more of a keystroke, a file selection, a file upload, and a cookie.

Example 4 may include the subject matter of any of Examples 1-3, and may further specify that the associated metadata includes metadata identifying the client device and/or the destination application.

Example 5 may include the subject matter of any of Examples 1-4, and may be further configured to log, based on an instruction that the submission request is disallowed, the disallowed submission request.

Example 6 may include the subject matter of any of Examples 1-5, and may be further configured to notify, based on an instruction that the submission request is disallowed, a network administrator of the disallowed submission request.

Example 7 may include the subject matter of any of Examples 1-6, and may be further configured to intercept, by the DLPe module, the dummy request; determine, by the DLPe module, an action to take with respect to the dummy request; and create, by the DLPe module, the response including an instruction for the action to take for the dummy request.

Example 8 is at least one non-transitory computer-readable medium comprising one or more instructions that when executed by a processor, cause the processor to receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy; receive, from the RBI agent, a plurality of inputs to the client device associated with the transfer request; create, by the RBI proxy, a submission request, wherein the submission request includes the plurality of inputs and associated metadata; send, from the RBI proxy, the submission request to the DLPe module; receive, by the RBI proxy, a response to the submission request, wherein the response includes an instruction to allow the submission request, to disallow the submission request, or to amend the submission request and allow the amended submission request; and process, by the RBI proxy, the submission request according to the instruction in the response.

Example 9 may include the subject matter of Example 8, and may further specify that the RBI proxy communicates with the DLPe module via a pre-selected communication protocol.

Example 10 may include the subject matter of any of Examples 8 and 9, and may further specify that the plurality of inputs to the client device include one or more of a keystroke, a file selection, a file upload, and a cookie.

Example 11 may include the subject matter of any of Examples 8-10, and may further specify that the associated metadata includes metadata identifying the client device and/or the destination application.

Example 12 may include the subject matter of any of Examples 8-11, and may further include one or more instructions that when executed by a processor, cause the processor to log, based on an instruction that the submission request is disallowed, the disallowed submission request.

Example 13 may include the subject matter of any of Examples 8-12, and may further include one or more instructions that when executed by a processor, cause the processor to notify, based on an instruction that the submission request is disallowed, a network administrator of the disallowed submission request.

Example 14 may include the subject matter of any of Examples 8-13, and may further include one or more instructions that when executed by a processor, cause the processor to notify, based on an instruction that the submission request is disallowed, a user of the client device that the transfer request is disallowed.

Example 15 is a method, including receiving, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy; receiving, from the RBI agent, a plurality of inputs to the client device associated with the transfer request; creating, by the RBI proxy, a submission request, wherein the submission request includes the plurality of inputs and metadata identifying the client device and the destination application; sending, from the RBI proxy, the submission request to the RBI agent; making, by the RBI agent, the submission request available to the DLPe module; receiving, by the RBI agent, a response to the submission request created by the DLPe module, wherein the response includes an instruction to allow the submission request, to disallow the submission request, or to amend the submission request and allow the amended submission request; receiving, by the RBI proxy from the RBI agent, the response to the submission request; and processing, by the RBI proxy, the submission request according to the instruction in the response.

Example 16 may include the subject matter of Example 15, and may further specify that the RBI agent makes the submission request available to the DLPe module by writing the submission request to a location in disk storage on the client device.

Example 17 may include the subject matter of Example 16, and may further specify that the RBI agent receives the response by retrieving the response from the location in the disk storage on the client device.

Example 18 may include the subject matter of Example 15, and may further specify that the RBI agent makes the submission request available to the DLPe module by sending the submission request to a DLP browser helper, and may further include sending, by the DLP browser helper, the submission request to the DLPe module; receiving, by the DLP browser helper, the response from the DLPe module; and sending the response to the RBI agent.

Example 19 may include the subject matter of Example 15, and may further specify that the plurality of inputs to the client device include one or more of a keystroke, a file selection, a file upload, and a cookie.

Example 20 may include the subject matter of Example 15, and may further include determining, by the DLPe module, an action to take with respect to the submission request; and creating, by the DLPe module, the response including an instruction for the action to take for the submission request.

The invention claimed is:

1. An apparatus, comprising:
   one or more memory devices operable to store instructions; and
   one or more processors operable to execute the instructions, such that the apparatus is configured to:
   receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy;
   receive, from the RBI agent, a plurality of inputs to the client device associated with the transfer request;
   create, by the RBI proxy, a submission request, wherein the submission request includes the plurality of inputs and associated metadata;
   send, from the RBI proxy, the submission request to the RBI agent;
   create, by the RBI agent, a dummy request, wherein the dummy request modifies the submission request to prevent the submission request from reaching the destination application;
   receive, by the RBI agent from the DLPe module, a response to the dummy request, wherein the response includes an instruction to allow the submission request or to disallow the submission request;

receive, by the RBI proxy from the RBI agent, the response to the dummy request; and process, by the RBI proxy, the submission request according to the instruction in the response to the dummy request.

2. The apparatus of claim 1, wherein the dummy request modifies the submission request by adding a request header that will be blocked by a network monitoring service, by adding an invalid port to a Uniform Resource Locator (URL), by adding an invalid component to a host name in the URL, by removing one or more authentication tokens, or by assigning an invalid protocol.

3. The apparatus of claim 1, wherein the plurality of inputs to the client device include one or more of a keystroke, a file selection, a file upload, and a cookie.

4. The apparatus of claim 1, wherein the associated metadata includes metadata identifying the client device and/or the destination application.

5. The apparatus of claim 1, further configured to:
log, based on an instruction that the submission request is disallowed, the disallowed submission request.

6. The apparatus of claim 1, further configured to:
notify, based on an instruction that the submission request is disallowed, a network administrator of the disallowed submission request.

7. The apparatus of claim 1, further configured to:
intercept, by the DLPe module, the dummy request;
determine, by the DLPe module, an action to take with respect to the dummy request; and
create, by the DLPe module, the response including an instruction for the action to take for the dummy request.

8. At least one non-transitory computer-readable medium comprising one or more instructions that when executed by a processor, cause the processor to:
receive, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy;
receive, from the RBI agent, a plurality of inputs to the client device associated with the transfer request;
create, by the RBI proxy, a submission request, wherein the submission request includes the plurality of inputs and associated metadata;
send, from the RBI proxy, the submission request to the DLPe module;
receive, by the RBI proxy, a response to the submission request, wherein the response includes an instruction to allow the submission request, to disallow the submission request, or to amend the submission request and allow the amended submission request; and
process, by the RBI proxy, the submission request according to the instruction in the response.

9. The at least one non-transitory computer-readable medium of claim 8, wherein the RBI proxy communicates with the DLPe module via a pre-selected communication protocol.

10. The at least one non-transitory computer-readable medium of claim 8, wherein the plurality of inputs to the client device include one or more of a keystroke, a file selection, a file upload, and a cookie.

11. The at least one non-transitory computer-readable medium of claim 8, wherein the associated metadata includes metadata identifying the client device and/or the destination application.

12. The at least one non-transitory computer-readable medium of claim 8, further comprising one or more instructions that when executed by a processor, cause the processor to:
log, based on an instruction that the submission request is disallowed, the disallowed submission request.

13. The at least one non-transitory computer-readable medium of claim 8, further comprising one or more instructions that when executed by a processor, cause the processor to:
notify, based on an instruction that the submission request is disallowed, a network administrator of the disallowed submission request.

14. The at least one non-transitory computer-readable medium of claim 8, further comprising one or more instructions that when executed by a processor, cause the processor to:
notify, based on an instruction that the submission request is disallowed, a user of the client device that the transfer request is disallowed.

15. A method, comprising:
receiving, by a remote browser isolation (RBI) proxy from a client device, a transfer request to send data to a destination application, wherein the client device is running an RBI agent and includes a Data Loss Prevention endpoint (DLPe) module, and wherein communications between the client device and the destination application are routed through the RBI proxy;
receiving, from the RBI agent, a plurality of inputs to the client device associated with the transfer request;
creating, by the RBI proxy, a submission request, wherein the submission request includes the plurality of inputs and metadata identifying the client device and the destination application;
sending, from the RBI proxy, the submission request to the RBI agent;
making, by the RBI agent, the submission request available to the DLPe module;
receiving, by the RBI agent, a response to the submission request created by the DLPe module, wherein the response includes an instruction to allow the submission request, to disallow the submission request, or to amend the submission request and allow the amended submission request;
receiving, by the RBI proxy from the RBI agent, the response to the submission request; and
processing, by the RBI proxy, the submission request according to the instruction in the response.

16. The method of claim 15, wherein the RBI agent makes the submission request available to the DLPe module by writing the submission request to a location in disk storage on the client device.

17. The method of claim 16, wherein the RBI agent receives the response by retrieving the response from the location in the disk storage on the client device.

18. The method of claim 15, wherein the RBI agent makes the submission request available to the DLPe module by sending the submission request to a DLP browser helper, and further comprising:
sending, by the DLP browser helper, the submission request to the DLPe module;
receiving, by the DLP browser helper, the response from the DLPe module; and
sending the response to the RBI agent.

19. The method of claim 15, wherein the plurality of inputs to the client device include one or more of a keystroke, a file selection, a file upload, and a cookie.

20. The method of claim 15, further comprising:
determining, by the DLPe module, an action to take with respect to the submission request; and
creating, by the DLPe module, the response including an instruction for the action to take for the submission request.

* * * * *